Feb. 14, 1933.  V. E. FLODIN  1,897,505

RADIATOR REAMING, FACING, AND TAPPING MACHINE

Filed March 19, 1930  19 Sheets-Sheet 2

Witness
R. B. Davison.

Inventor
Victor E. Flodin
By Wilson, Dowell, McCanna & Rehm
Attys.

Feb. 14, 1933.  V. E. FLODIN  1,897,505
RADIATOR REAMING, FACING, AND TAPPING MACHINE
Filed March 19, 1930     19 Sheets-Sheet 4

Inventor
Victor E. Flodin

Feb. 14, 1933.   V. E. FLODIN   1,897,505
RADIATOR REAMING, FACING, AND TAPPING MACHINE
Filed March 19, 1930   19 Sheets-Sheet 6

Inventor
Victor E. Flodin
By Wilson, Dowell, McCanna & Pelm
Attys.

Witness
R B Davison

Feb. 14, 1933.   V. E. FLODIN   1,897,505
RADIATOR REAMING, FACING, AND TAPPING MACHINE
Filed March 19, 1930   19 Sheets-Sheet 8

Witness
R. B. Davison

Inventor
Victor E. Flodin
By Wilson, Dowell, McCanna & Rehm
Attys.

Feb. 14, 1933.  V. E. FLODIN  1,897,505
RADIATOR REAMING, FACING, AND TAPPING MACHINE
Filed March 19, 1930  19 Sheets-Sheet 9
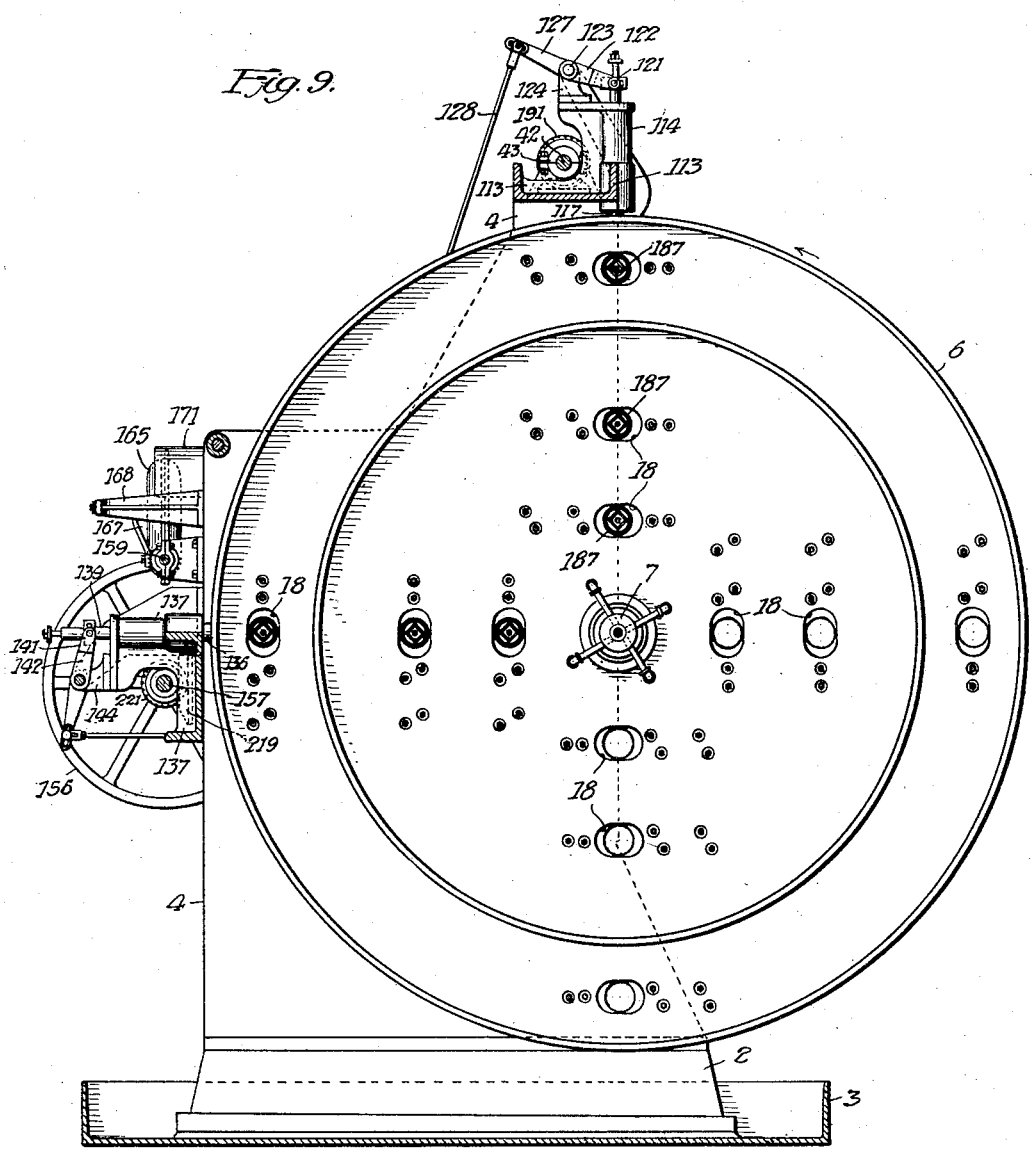
Inventor
Victor E. Flodin

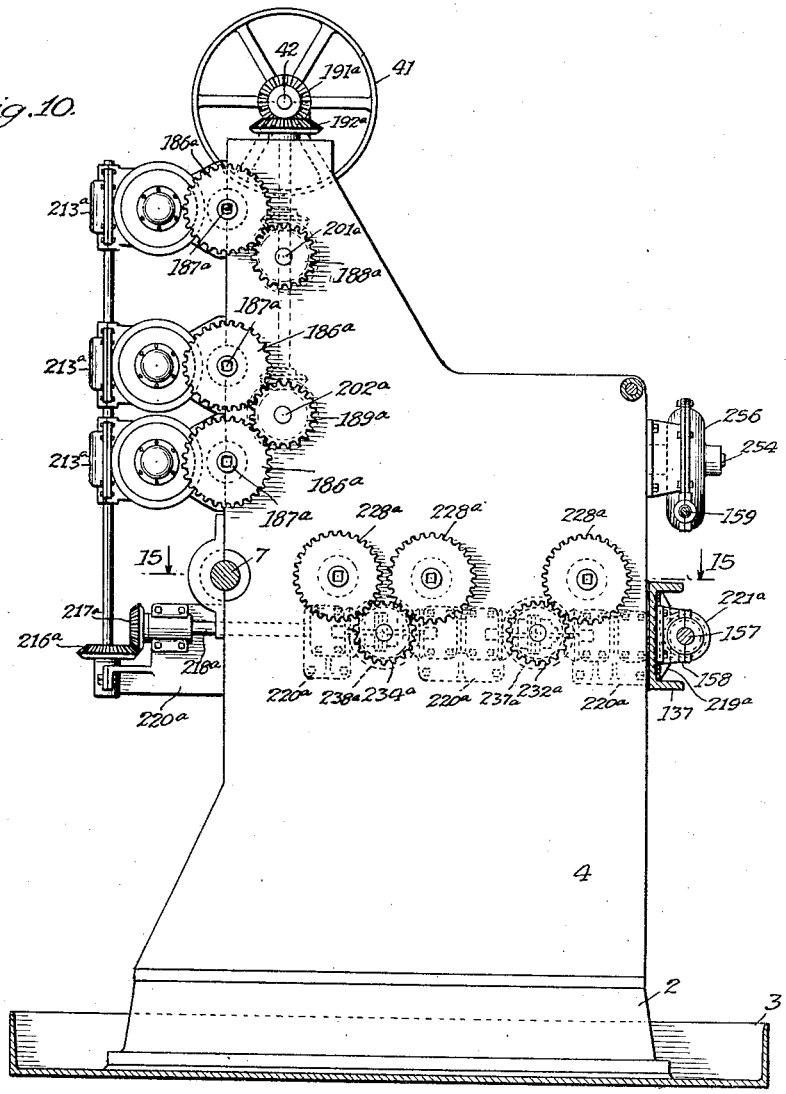

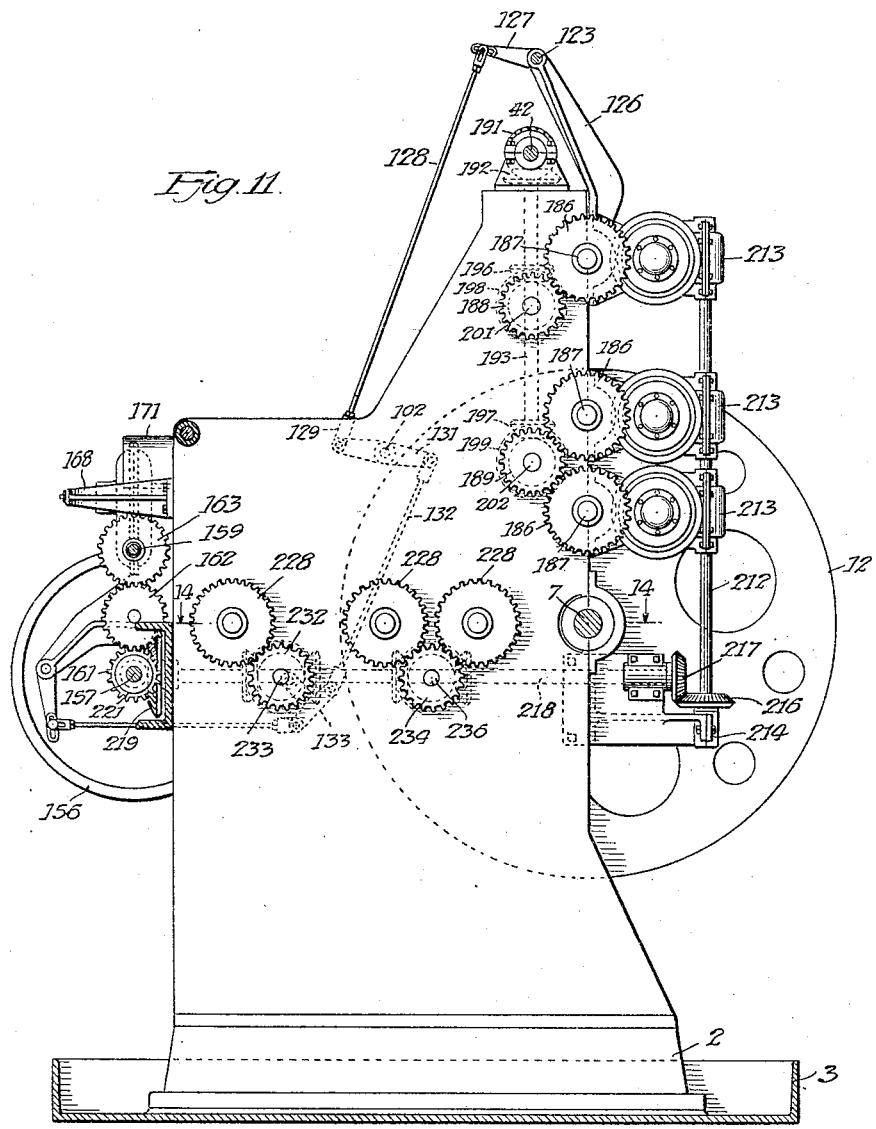

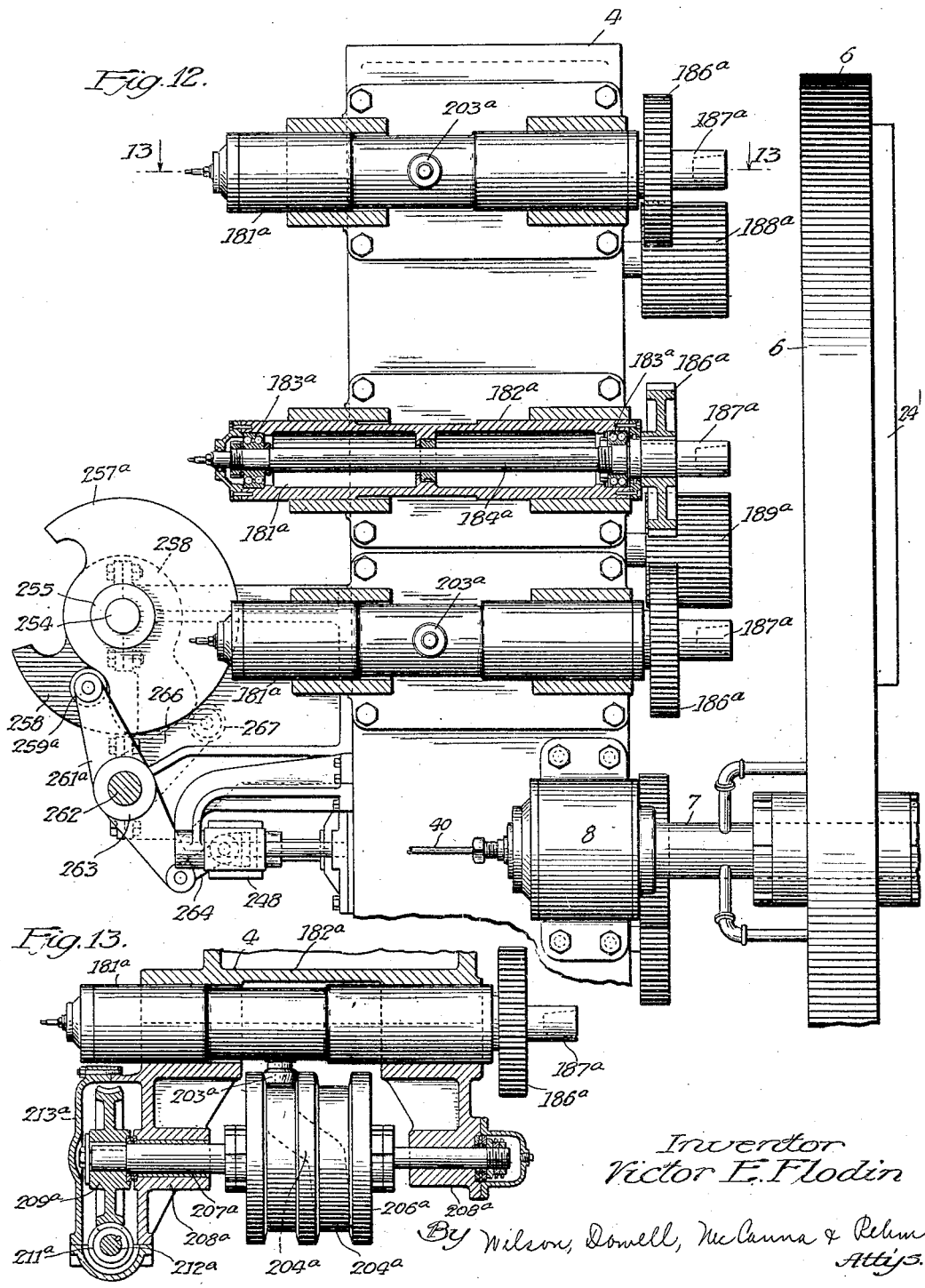

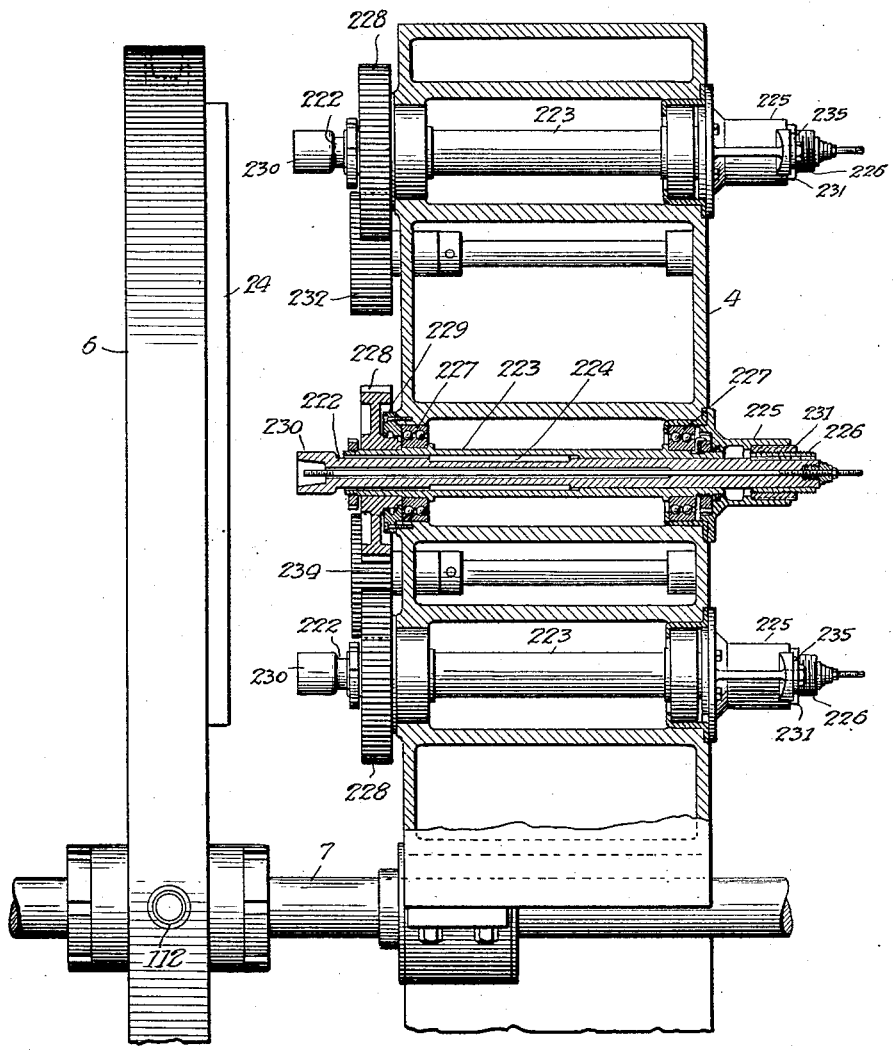

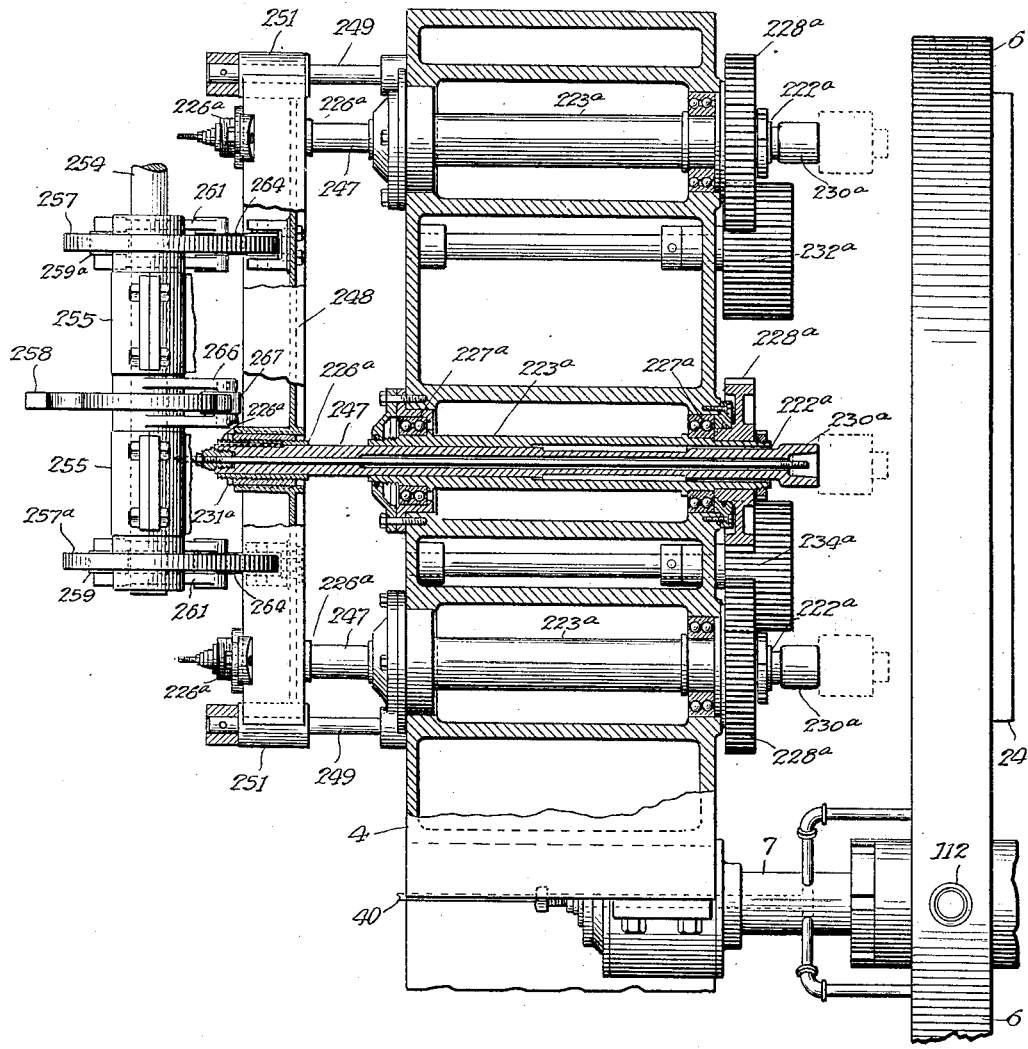

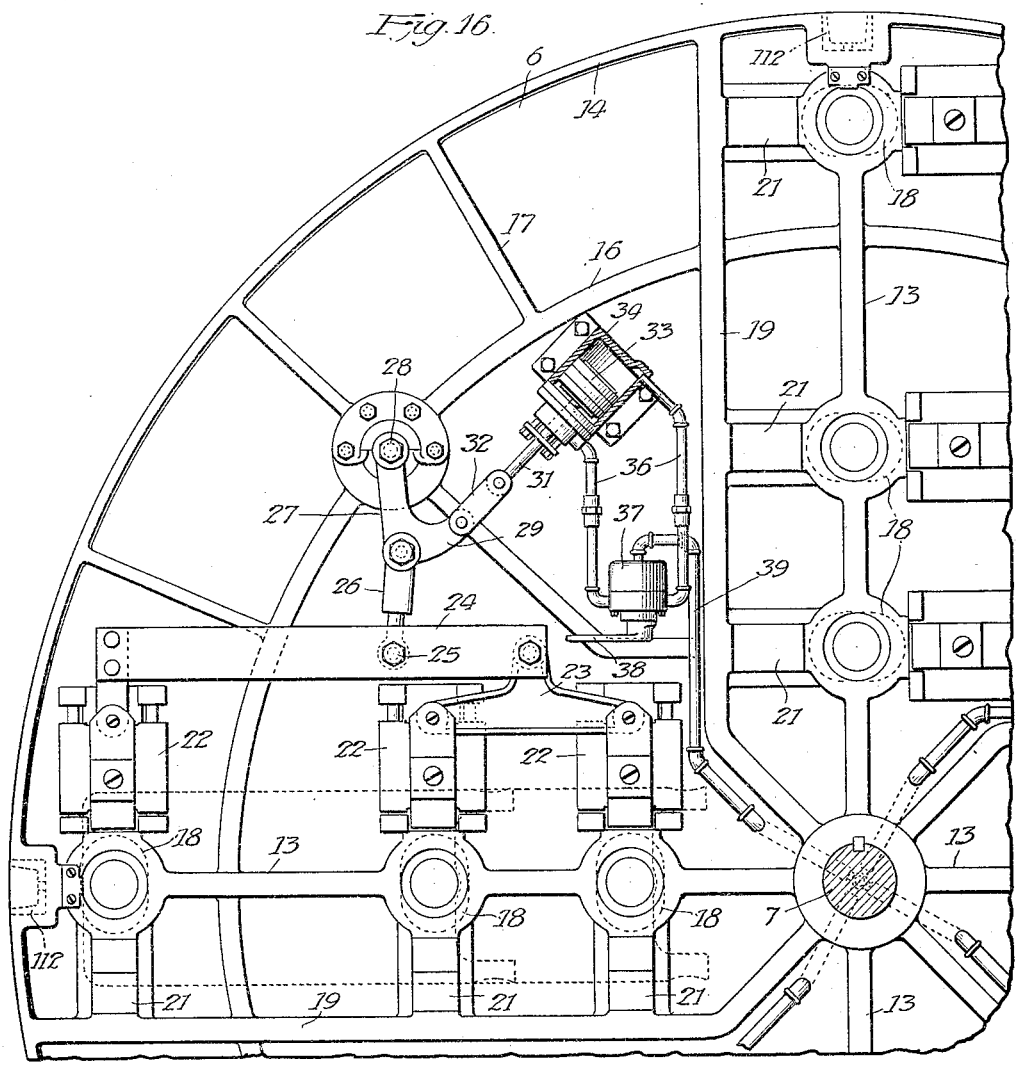

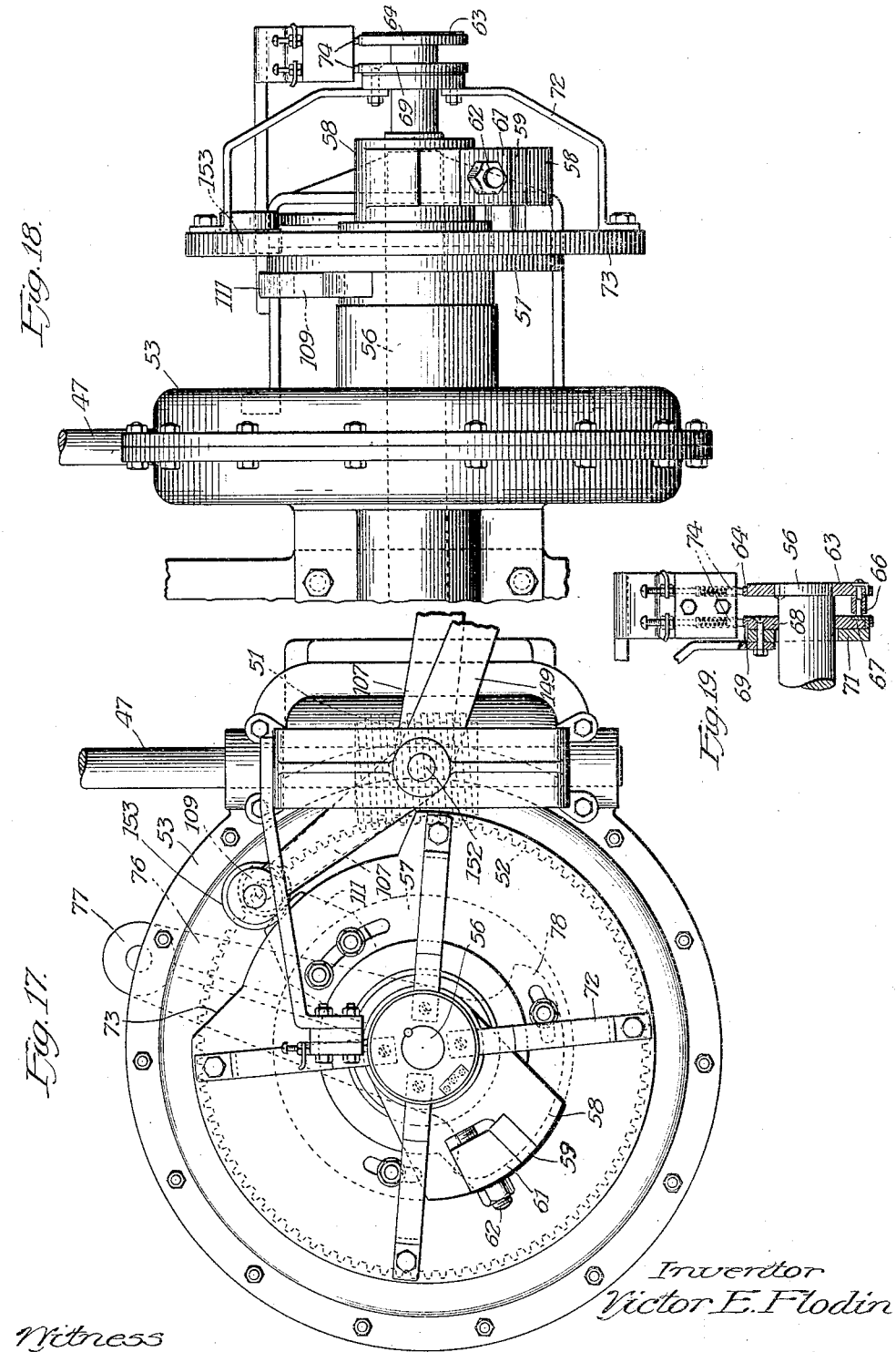

Feb. 14, 1933.    V. E. FLODIN    1,897,505
RADIATOR REAMING, FACING, AND TAPPING MACHINE
Filed March 19, 1930    19 Sheets-Sheet 17
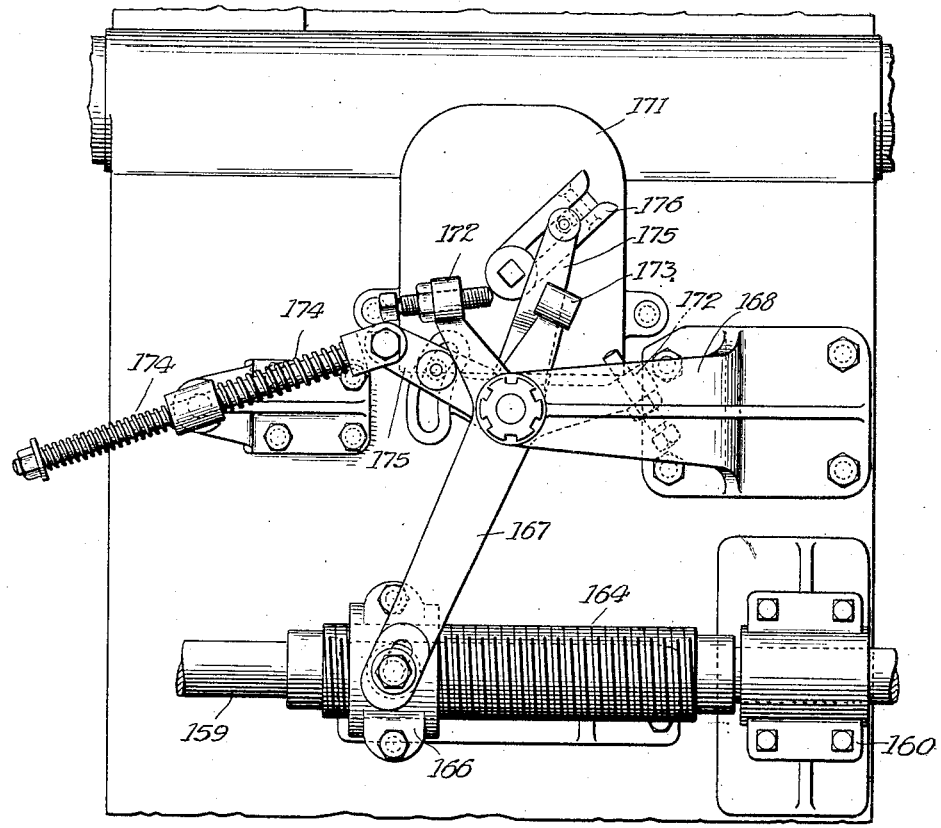
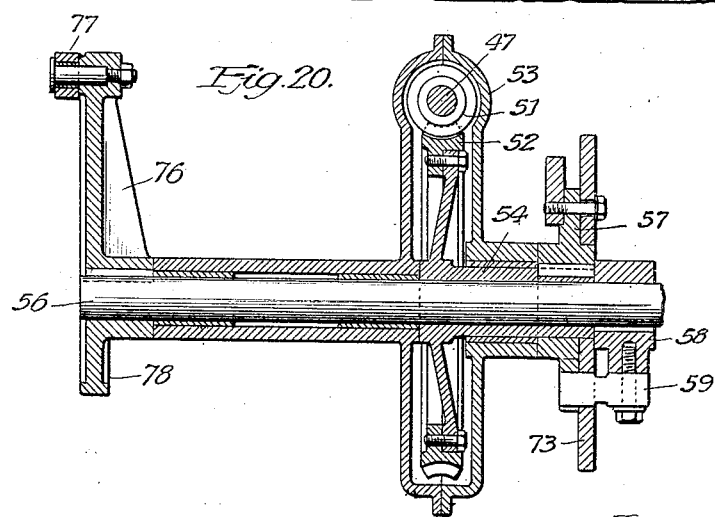
Inventor
Victor E. Flodin
By Wilson, Dowell, McCanna & Rehm
Att'ys.

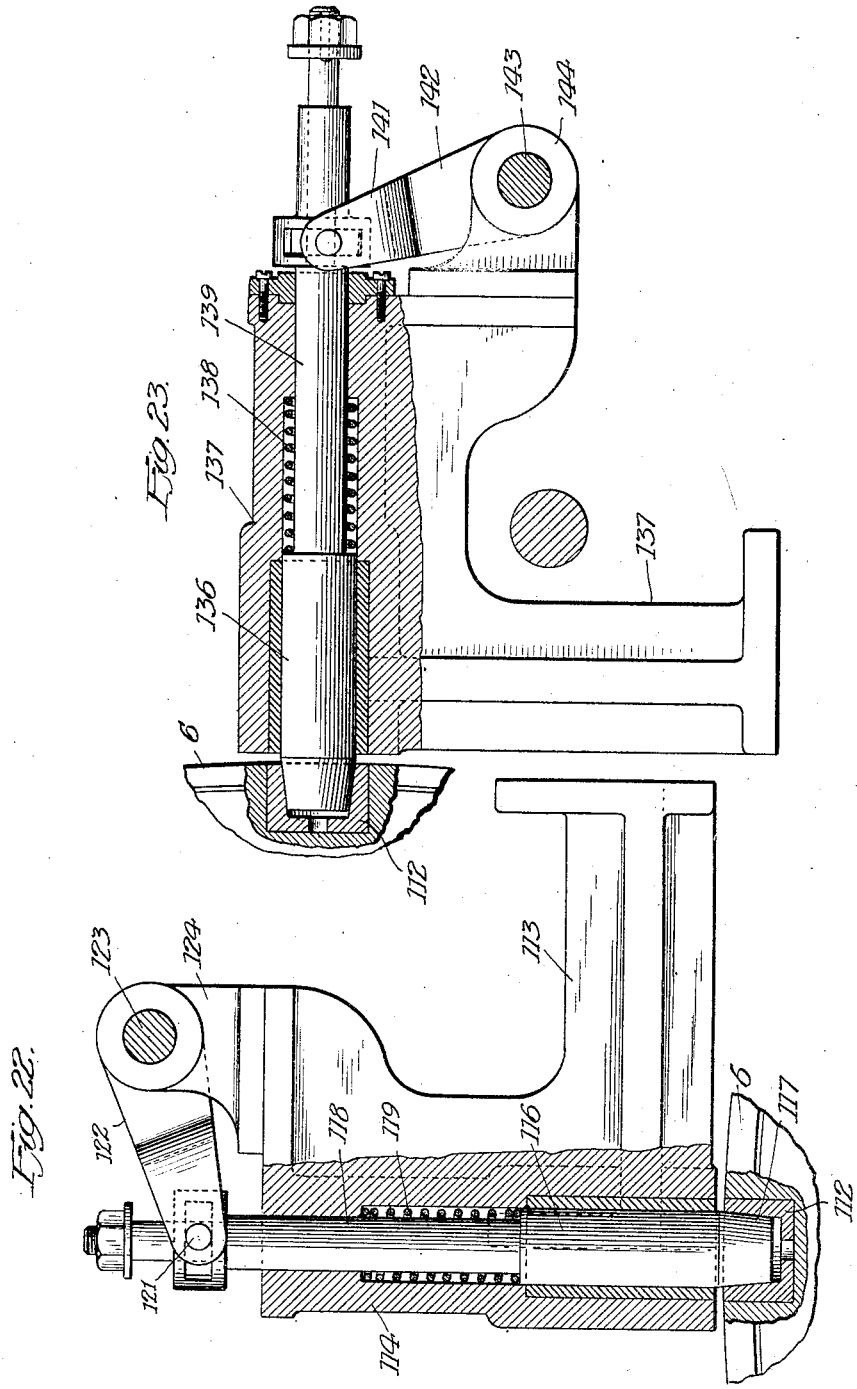

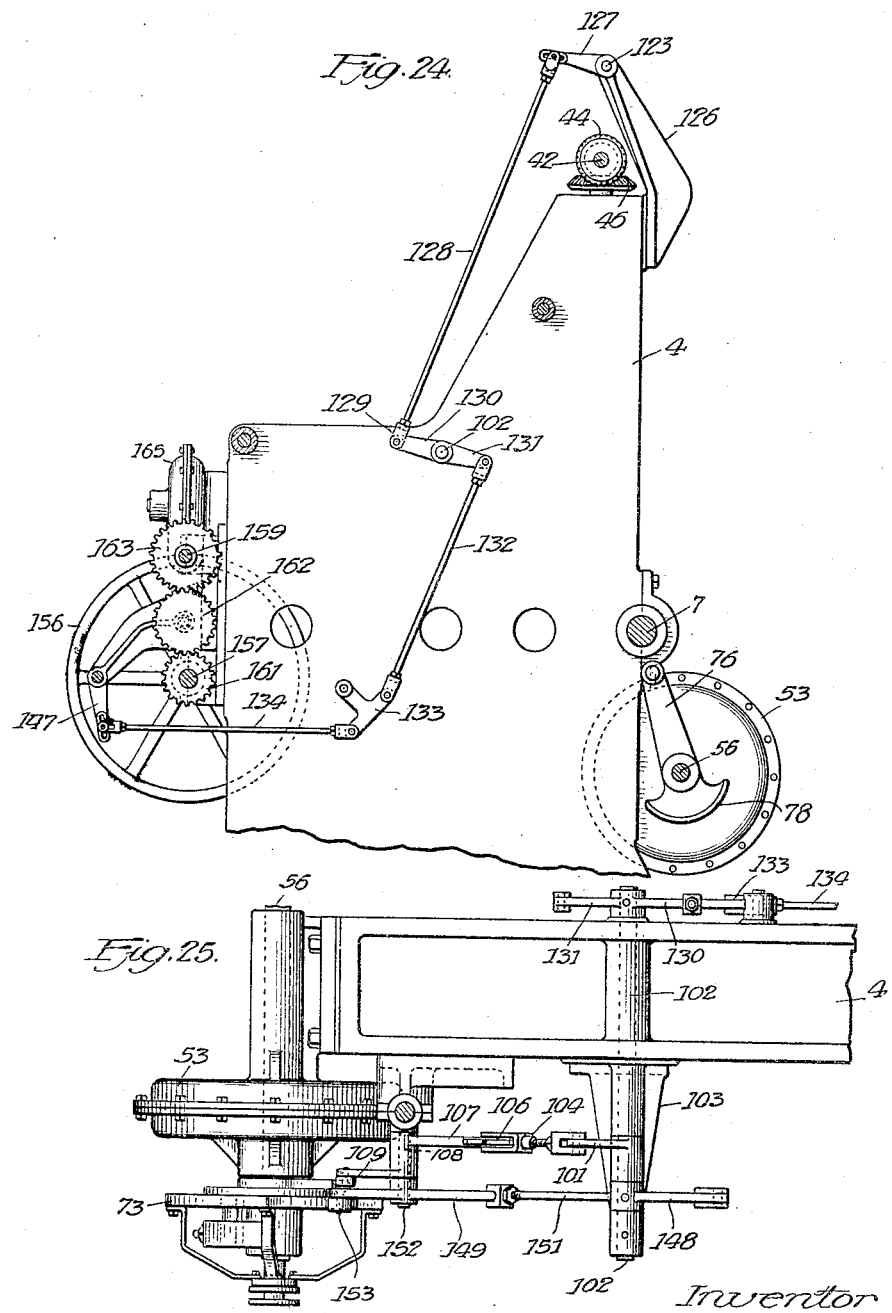

Patented Feb. 14, 1933

1,897,505

UNITED STATES PATENT OFFICE

VICTOR E. FLODIN, OF OAK PARK, ILLINOIS, ASSIGNOR TO CRANE CO., OF CHICAGO, ILLINOIS, A CORPORATION OF ILLINOIS

RADIATOR REAMING, FACING, AND TAPPING MACHINE

Application filed March 19, 1930. Serial No. 437,206.

This invention relates to machines used in the manufacture of radiators and more particularly to a machine for reaming, facing and tapping the connecting portions of radiator sections which are to be secured together to make up a radiator.

Complete radiators are made up of a plurality of sections joined together to provide a radiator of given heating capacity in accordance with the size of the space to be heated. The sections are connected together for continuous flow therethrough of the heating fluid by means of openings or passages through each end of the radiator sections. Generally these openings are threaded to receive right and left nipples which serve to connect the openings, and draw and hold together the sections. A gasket is usually placed between the abutting faces of the radiator sections.

It is apparent that the connecting openings through the radiator sections must all be uniformly and accurately reamed, faced and tapped particularly if the sections are to be made in quantity and radiators made up from stocks of suitably sized sections. The above mentioned operations must be made rapidly and with as little handling by operators as possible if the radiator sections are to be made in quantity and economically. It is to these finishing operations singly and collectively that this invention relates.

It is the purpose of this invention to provide a single machine which will ream, face and tap a radiator section and which is automatic and continuous in operation.

It is also the purpose of this invention to provide such a machine which will ream, face and tap both connecting openings of a radiator section and which also will operate upon a plurality of sections simultaneously.

It is also an object of this invention to provide such a machine which will operate upon various sized radiator sections.

According to this invention a dial type machine is provided in which a plurality of radiator sections are arranged radially around the dial and moved consecutively through a cycle comprising a series of operations performed at a series of positions, i. e., at each position a certain operation is performed by suitable tools. The tools are moved into and out of operating position while the radiator is rigidly held and accurately located at each of the prescribed positions. A suitable number of tools are provided and arranged whereby both sides of both ends of the radiator are operated upon simultaneously thus eliminating the necessity of removing the radiator section from the machine and replacing it therein to have the opposite side finished. The operating positions of the dial are so arranged and selected in cooperation with the operating tools that different operations may be performed upon a plurality of radiator sections simultaneously thus making it possible to operate the machine continuously to finish more than one radiator section at a time.

The dial is provided with means for securing a plurality of radiator sections in exactly located positions in order that uniformity and accuracy is obtained in finishing each radiator section. Positive means are provided for rotating the dial to the various positions and additional means are provided for rigidly and accurately locating and locking the dial in each of the operative positions. Means are further provided in connection with various features of the machine that should any one part thereof fail to function in the proper manner the entire machine automatically will be stopped.

A better understanding of the novel features, advantages and construction of this invention will be had from the following detailed description given in connection with the drawings illustrating one form of this invention and in which:

Fig. 3a is an enlarged fragmentary detail of the clutch throwing cam as viewed in right end elevation.

Fig. 9 is a vertical section on line 9—9 of Figs. 4 and 5 and illustrates the right face of the radiator dial showing the apertures therethrough which permit passage of the operating tools.

Fig. 10 is a vertical section on line 10—10 of Figs. 4 and 5 illustrating the continuation of the operating drives for the reamers and taps.

Fig. 11 is a vertical section on line 11—11 of Figs. 4 and 5 and illustrates the drive for the opposite set of reamers and taps.

Fig. 12 is an enlarged vertical section taken along line 12—12 of Fig. 2 and illustrates the drive for one set of reamers and the cams for actuating one set of tapping spindles.

Fig. 13 is an enlarged fragmentary section on line 13—13 of Figs. 2 and 12 illustrating the cam mechanism whereby one set of reamers are given their initial movement.

Fig. 14 is an enlarged section on line 14—14 of Figs. 8 and 11 illustrating the screw or leader mechanism for actuating one set of taps.

Fig. 15 is an enlarged section on line 15—15 of Figs. 2 and 10 and illustrates the driving mechanism for the opposite set of taps.

Fig. 16 is an enlarged partial section on line 7—7 of Figs. 4 and 5 and illustrates a portion of the radiator dial showing in detail the clamping mechanism for rigidly holding a radiator section in place.

Fig. 17 is an enlarged fragmentary end elevation of a portion of the right end of the machine showing the main clutch releasing mechanism and indexing drive.

Fig. 18 is a front elevation of the parts shown in Fig. 17.

Fig. 19 is a detail partly in section of an electrical safety switch applied to the mechanism shown in Figs. 17 and 18.

Fig. 20 is an enlarged sectional detail of the indexing dial, driven shaft and associated mechanism for rotating the indexing dial.

Fig. 21 is an enlarged rear elevation showing in detail the reversing mechanism and switch.

Fig. 22 is an enlarged detail partly in section of one of the radiator dial or disk locking pins.

Fig. 23 is a similar view of the second locking pin.

Fig. 24 is a partial section on line 24—24 of Figs. 4 and 5 showing the locking pin operating rods; and Fig. 25 is a fragmentary enlarged plan showing the clutch control rod and locking pin rod shaft.

Figure 1:
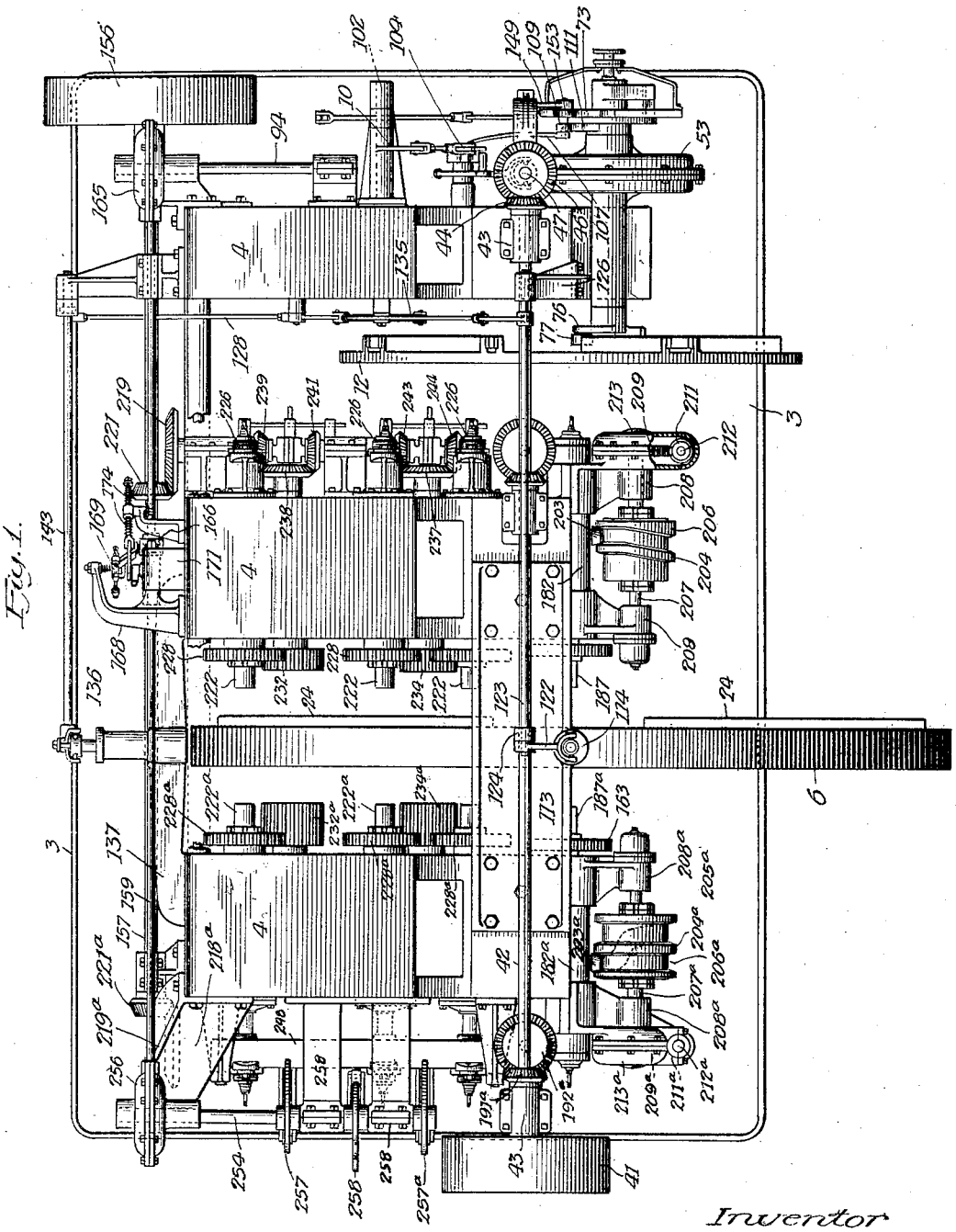
Fig. 1 is a plan view of a machine embodying this invention.
Figure 3:
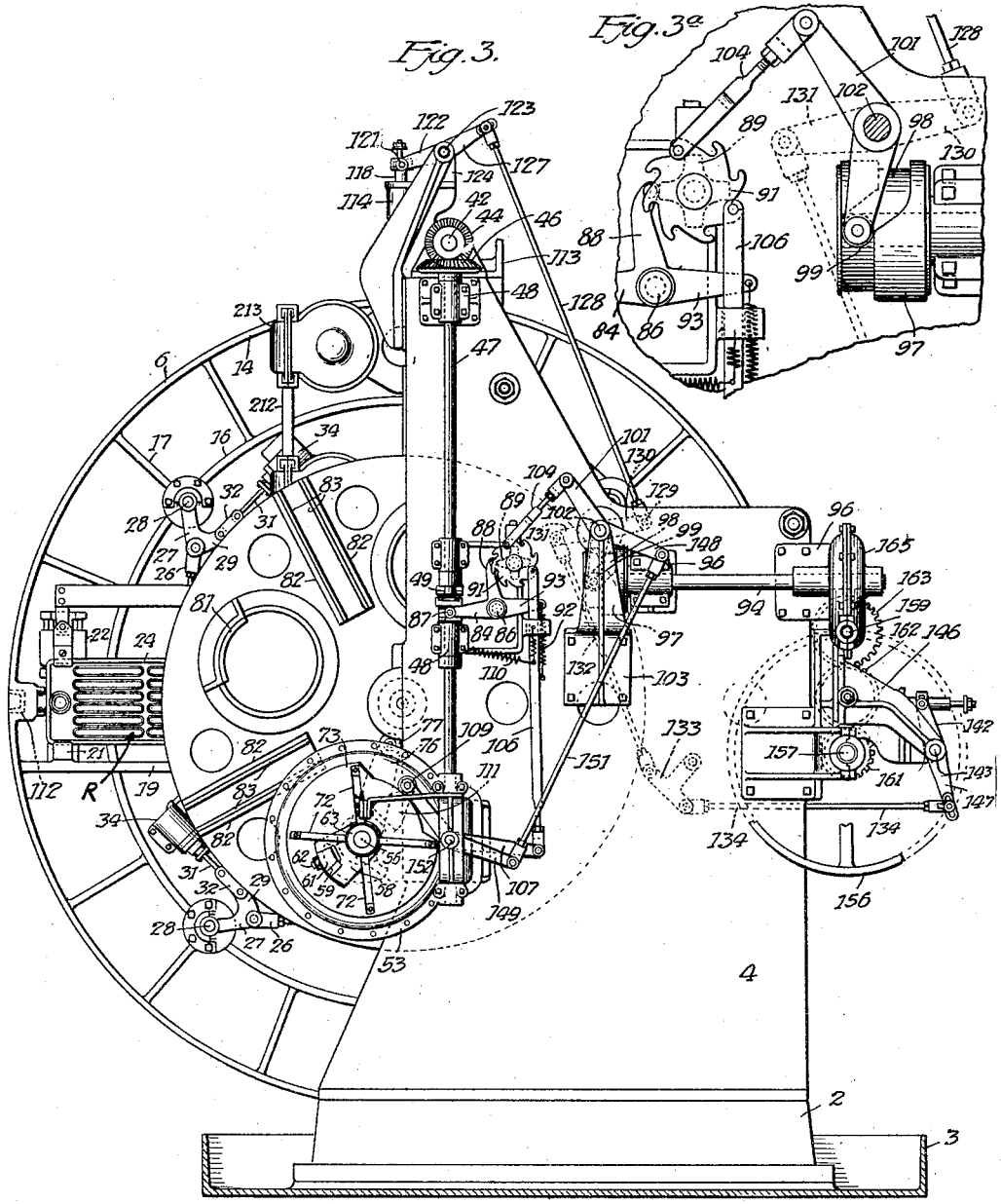
Fig. 3 is a right end elevation.
Figure 4:
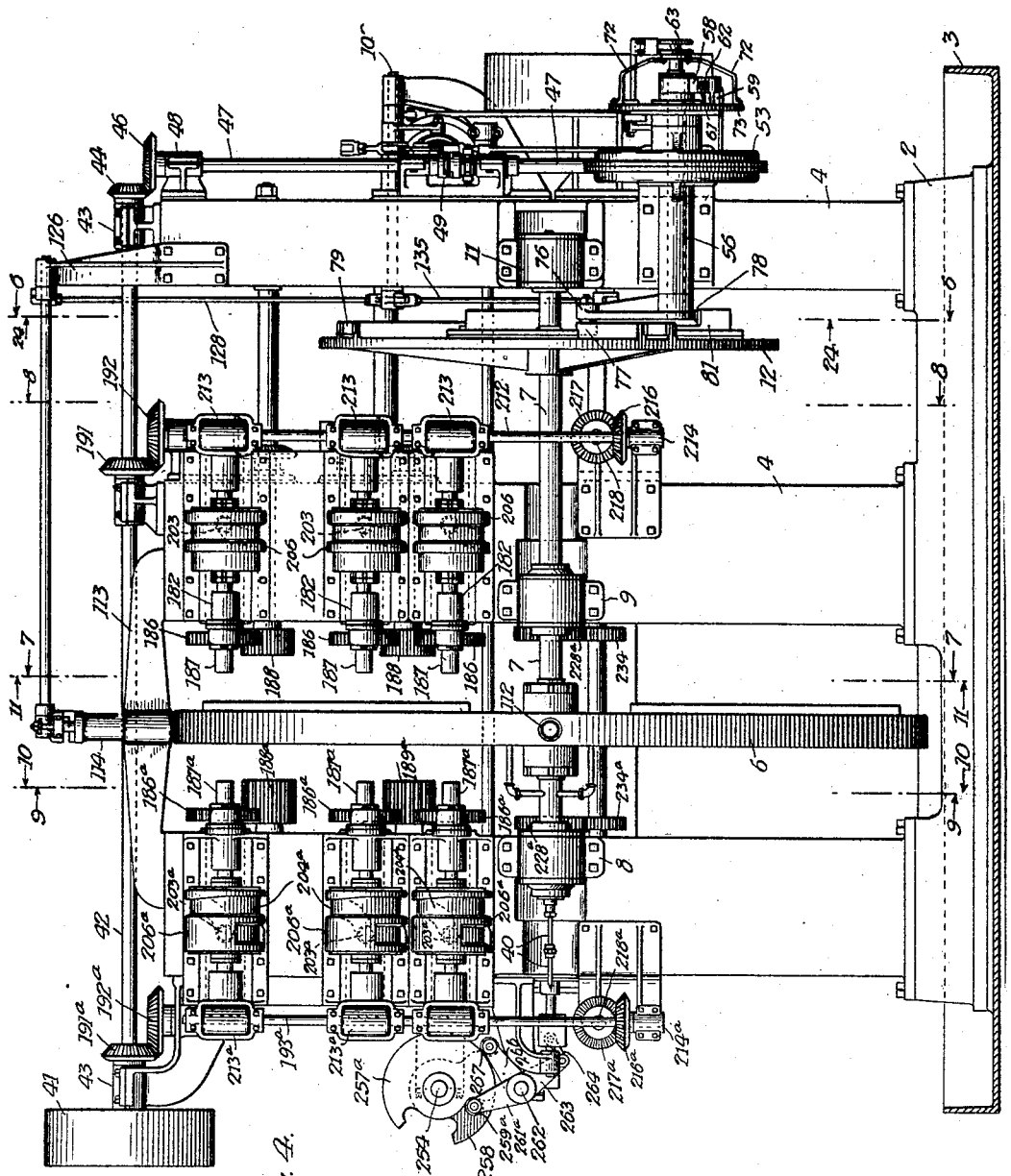
Fig. 4 is a front elevation.
Figure 5:
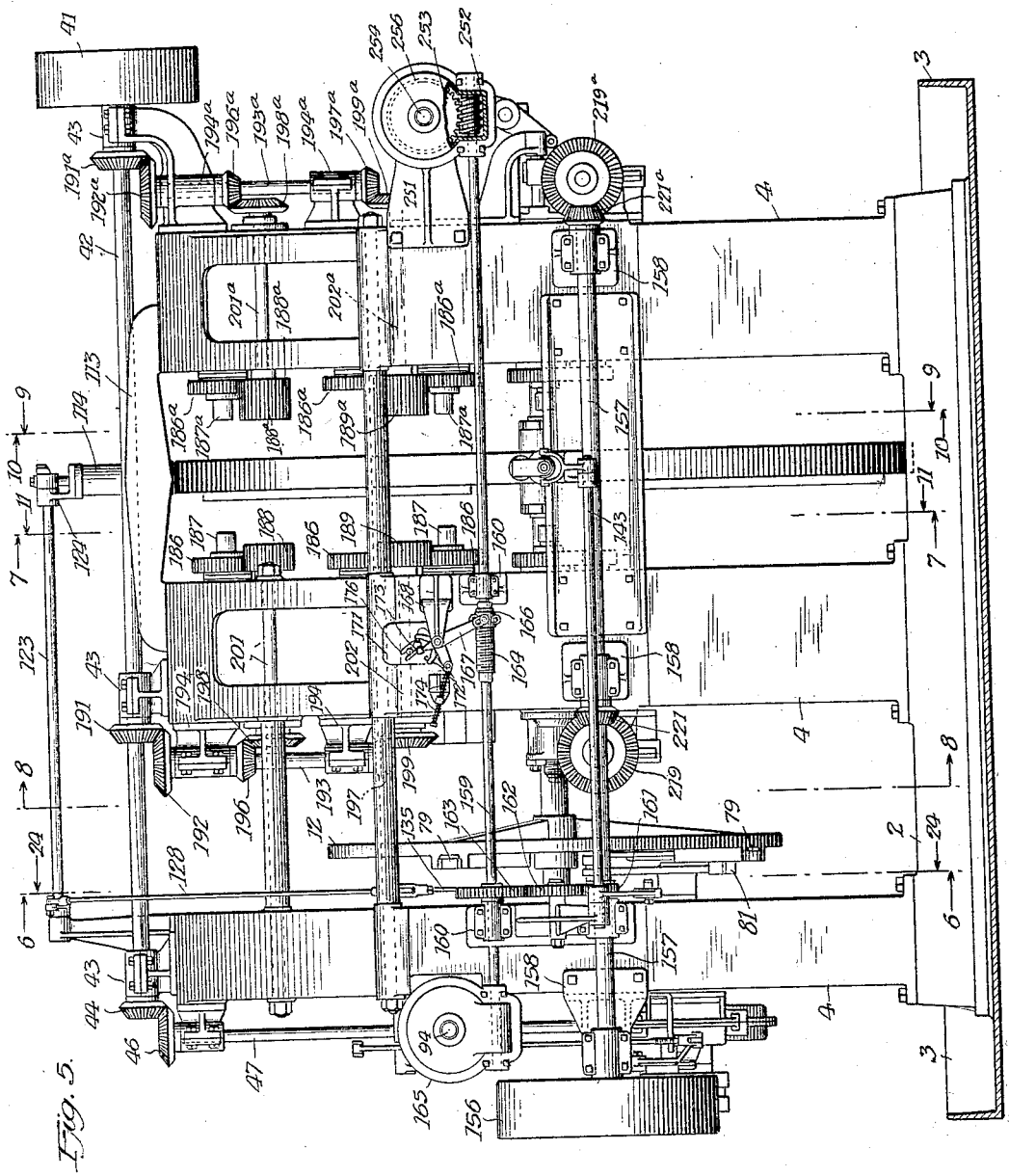
Fig. 5 is a rear elevation.

Referring first to the machine in a general way and particularly to Figs. 1, 4 and 5, it will be seen that the entire machine is supported upon a rectangular bed 2 surrounded by a pan 3 designed to catch and retain lubricating and cutting oils. Arising from the bed from each end and the center thereof are three standards 4 which form the supports for the various driving and operating mechanisms. Between and supported by the left and center standards as viewed in Figs. 1 and 4 is a large circular disk or dial 6 mounted for rotation about a horizontal shaft 7 the latter being supported by aligned bearings 8, 9 and 11 mounted in the forward edges of the three standards. Shaft 7 extends the full length of the machine, that is, the full width of the three standards and carries between the center and right standards an indexing dial 12 by means of which the radiator dial 6 is intermittently rotated about its axis to present the radiator sections carried by dial 6 to predetermined stations or positions at which the radiator sections will be operated upon. As shown better in Figs. 3, 6, 7, and 16 the main or radiator dial 6 is provided with clamping means for supporting four radiator sections R with their longitudinal axes arranged radially of the dial and equally spaced thereabout.

Through the medium of the indexing dial 12 and associated mechanism the radiator dial 6 is intermittently rotated about its axis to present the radiator sections held by the dial to four operating positions or stations spaced about the dial. The first station at which the radiator is to the front of the machine and in a horizontal position is the loading and unloading station at which the radiator sections are inserted and removed from the machine. The second station is vertically over the shaft 7 and in which the radiator is at the top of the dial in a vertical position. This station or position is the reaming and facing station at which the ends of the radiators are reamed and faced. The third position is to the rear of the machine and in which the radiator is in a horizontal position diametrically opposite to the first station and is the station at which the ends of the radiator are tapped. The fourth station which is at the bottom of the dial diametrically opposite the second station is an idle position nothing being done to the radiator sections at this position.

As has been heretofore stated, the machine is adapted simultaneously to ream, face and tap both sides of both ends of the radiator sections. For this purpose the machine is provided with a plurality of reaming spindles which support reaming tools upon each side of the dial 6 at the reaming station in such a manner that they will act upon both sides of both ends of the radiator sections. Tapping tools are also supported at the tapping station in the same manner.

Having described the general layout of the machine the supporting dial and clamping mechanism for securing the radiator sections thereto will first be described.

Figure 7:
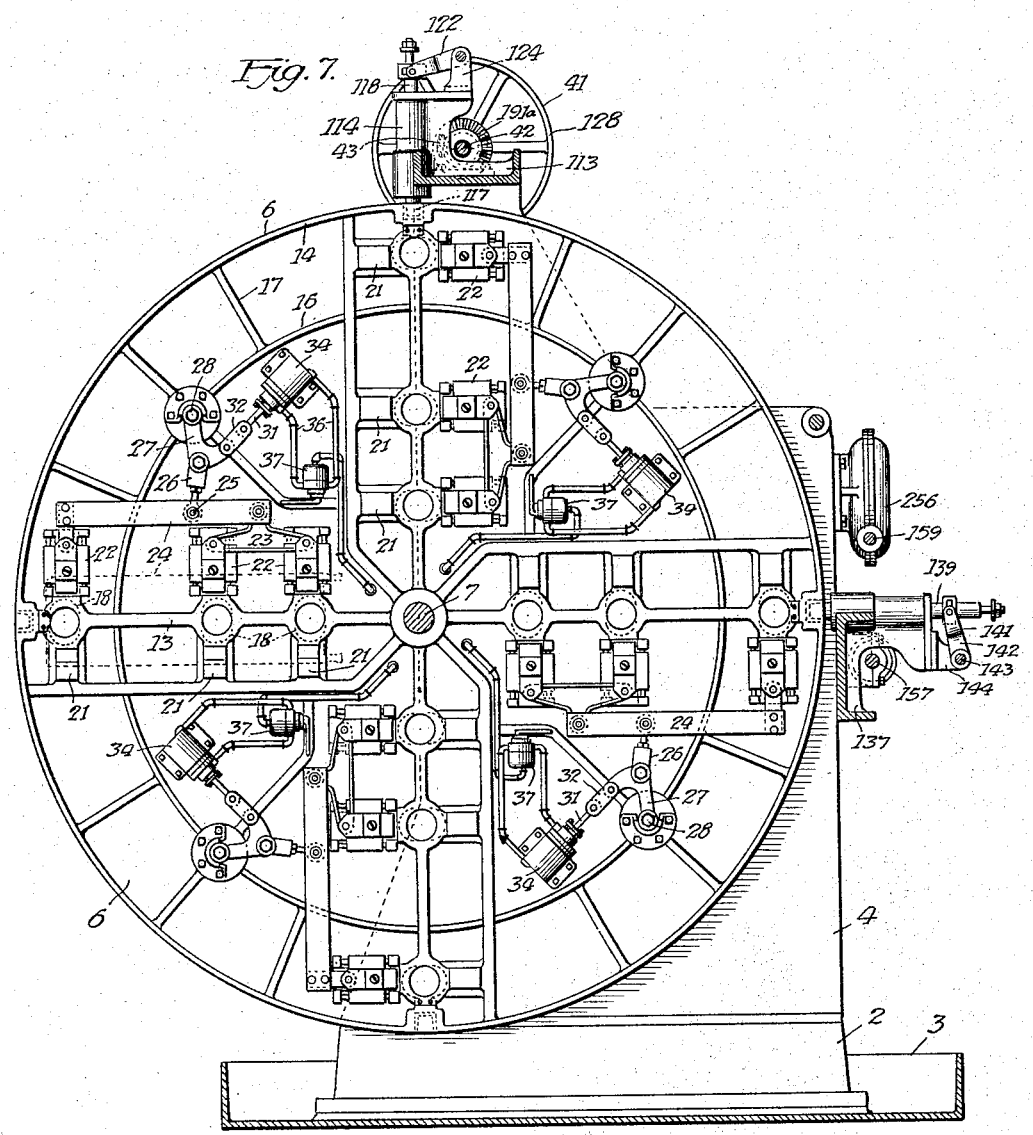
Fig. 7 is a vertical section on line 7—7 of Figs. 4 and 5 and illustrates the right face of the radiator dial showing the arrangement of the clamping and radiator holding mechanisms the lock pins being shown in locking position.
Figure 8:
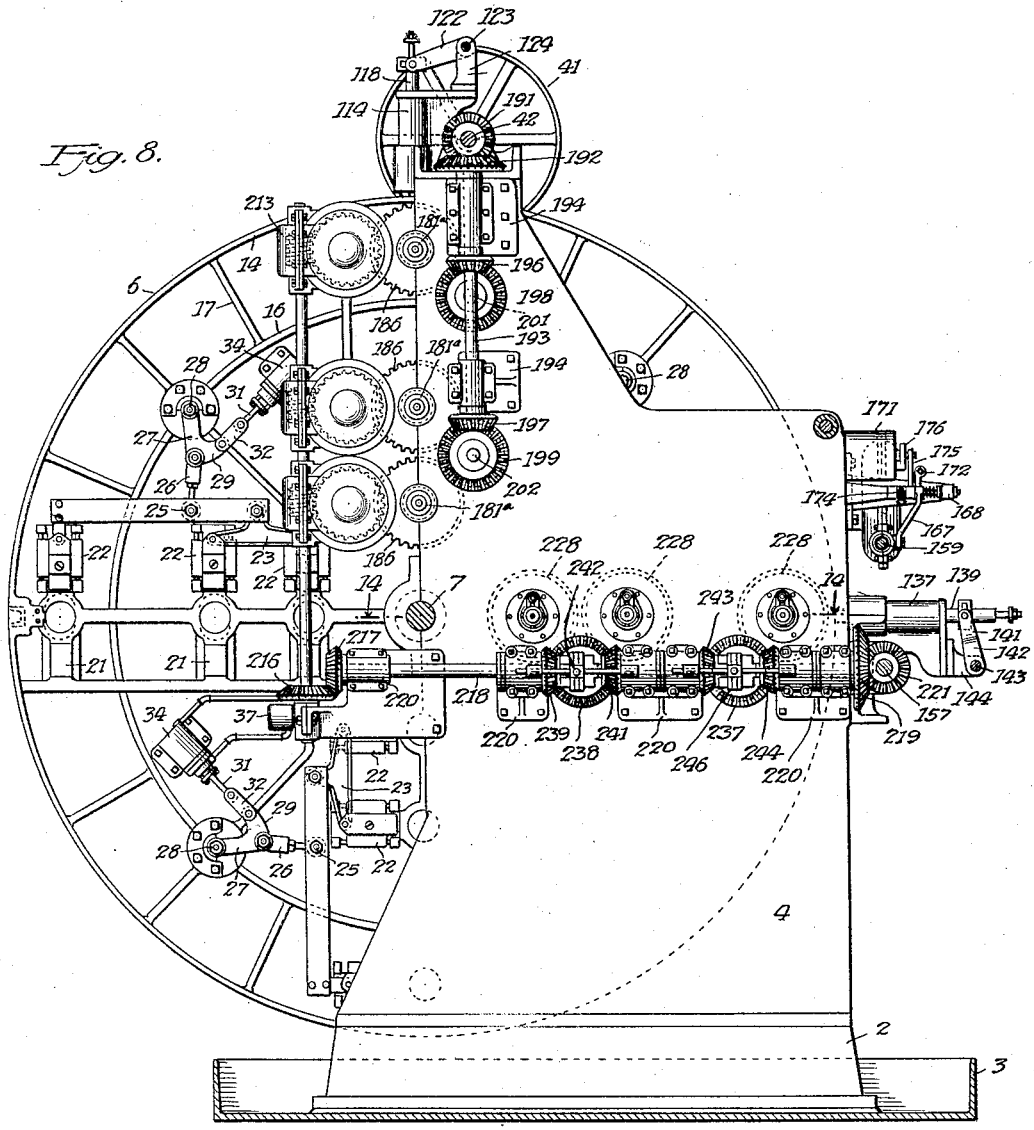
Fig. 8 is a vertical section along line 8—8 of Figs. 4 and 5 and illustrates the driving mechanism of one set of reamers and taps.

The main dial and the clamping mechanism for supporting the radiator sections upon one face of the dial 6 are best shown in Figs. 3, 7, and 16. With particular reference to these figures it will be seen that the dial 6 is divided into quadrants by four strengthening ribs 13. The dial is further strengthened by concentric circular ribs 14 and 16 the latter being joined by short radial ribs 17. The dial is also provided along the ribs 13 with three aligned elongated openings 18. The two end openings having their centers spaced apart the distance of the centers of openings in the ends of a given sized radiator. The center opening 18 is spaced from the outer end opening 18 the distance of the connecting openings of a different sized radiator section. The machine is thus capable of handling two different sizes of radiator sections.

Spaced from each of the three openings and parallel to the axes thereof is a strengthening rib 19 having three raised abutment blocks 21 which form the stationary jaws for the clamps which support the radiator sections in position. Upon the other side of the openings 18 directly opposite the blocks 21 are three movable jaws 22 the inner two of the jaws 22 being carried upon the ends of a link 23. The outer jaws 22 and link 23 are pivotally connected to the ends of a bar 24 which is pivoted intermediate its length at 25 to a thrust rod 26 which comprises one link of a toggle-like mechanism. The rod 26 is pivoted at its end to a lever 27 one end of which is pivoted to the dial 6 at a fixed point 28. Lever 27 has an arcuate projection 29 which is connected to the end of a piston rod 31 through an intermediate link 32. The piston rod 31 is attached to a piston 33 operable in a cylinder 34, the rod, piston, and cylinder comprising a fluid operated means for actuating the lever 27 and consequently the movable jaws 22. In order to prevent locking and to allow for variance in radiator section size the rod 26 is made adjustable and is adjusted so that the pivotal centers 28 and 25 are not in exact alignment with the point of connection of rod 26 with lever 27.

The cylinder 34 is connected by pipes 36 to receive a fluid such as compressed air upon either side of the piston 33 the fluid being controlled by a valve 37 having an operating handle 38. Valve 37 may be of any suitable construction which will have at least two positions, one operable to place one side of the piston 33 under pressure and exhaust the other side, and the second operable to pass fluid under pressure to the opposite side of the piston while exhausting the first side. By this means the radiator sections are positively and rigidly clamped to the dial and yet may be positively released. Any suitable supply of fluid may be conducted to the valve 37 by a pipe 39 which may be conveniently brought through the main shaft 7 and connected to a source by pipe 40 as illustrated.

The mechanism for rotating and indexing the dial will now be described. As previously stated the radiator dial 6 is rotated to present the radiator sections to the various operating positions through the medium of an indexing dial and associated mechanism. This mechanism is best shown in Figs. 1, 3, 4, 5, 17, 18, and 20. The main drive is obtained from any suitable source (not shown) and applied to pulley 41 keyed to the left end of the transverse shaft 42 as viewed in Figs. 1 and 4. This shaft extends across the top of the machine for the full length thereof being journalled in bearings 43 carried upon the upper ends of standards 4. To the right end of shaft 42 is secured a bevel gear 44 which meshes with a bevel gear 46 keyed to the upper end of a vertical shaft 47. The latter shaft being journalled in bearings 48 carried by the end standard 4. The shaft 47 is broken intermediate its length and provided with a clutch 49. At its lower end the shaft 47 carries a worm 51 which meshes with a worm wheel 52 the worm and worm wheel being supported in a housing 53. The worm wheel 52 is in the form of a ring gear (Figs. 17 and 20) and is secured to a sleeve 54 the sleeve being rotatably carried on a shaft 56 journalled in an elongated bearing supported upon the front side of the end standard 4. Keyed to the outer end of sleeve 54 for rotation therewith is a slotted disk or flange 57. Keyed to the shaft 56 is a breaker hub 58 which is also slotted to receive a breaking piece or connect-link 59 which extends between the slot in the breaker hub and the slot in disk 57 thus providing a positive connection between worm wheel 52 and shaft 56. The breaking link is a weakened link thus providing a mechanical fuse which will be broken upon any undue strains and prevent damage to the machine. The breaking link may be secured in the breaker hub by means of a wedge block 61 and stud 62.

As an additional safety device shaft 56 (Figs. 18 and 19) is extended beyond the breaker hub and has secured to its outer end for rotation therewith a disk 63 of insulating material having a slip ring 64 of some good conducting material thereon. The disk 63 also carries a laterally projecting brush 66 which is in electrical communication with slip ring 64 and engages a contact strip 67 secured to a second insulated disk 68 mounted for rotation on shaft 56 adjacent disk 63. Disk 68 also carries a slip ring 69. The disk 68 is secured to cam plate 73 for rotation therewith through the medium of arms 72, lock pin cam plate 73, being secured to flange 57, and the latter being keyed to sleeve 54. A pair of brushes 74 are arranged to bear upon the contact rings 64 and 69, the brushes being in series in one wire of the electrical circuit supplying energy to the driving motor (not shown). It follows from the above that as long as sleeve 54 and shaft 56 are driven together brush 66 will remain in contact with the contact member 67 and the circuit through brushes 74 will be continuous. Should the breaker link 59 become broken the sleeve 54 would continue to rotate as would disk 68 and contact member 67. The link being broken, however, shaft 56 would remain stationary as would disk 63 engaged by brush 66. As contact member 67 leaves brush 66, the electric circuit through brushes 74 would be broken and consequently the circuit to the driving motor would be broken.

Figure 6:
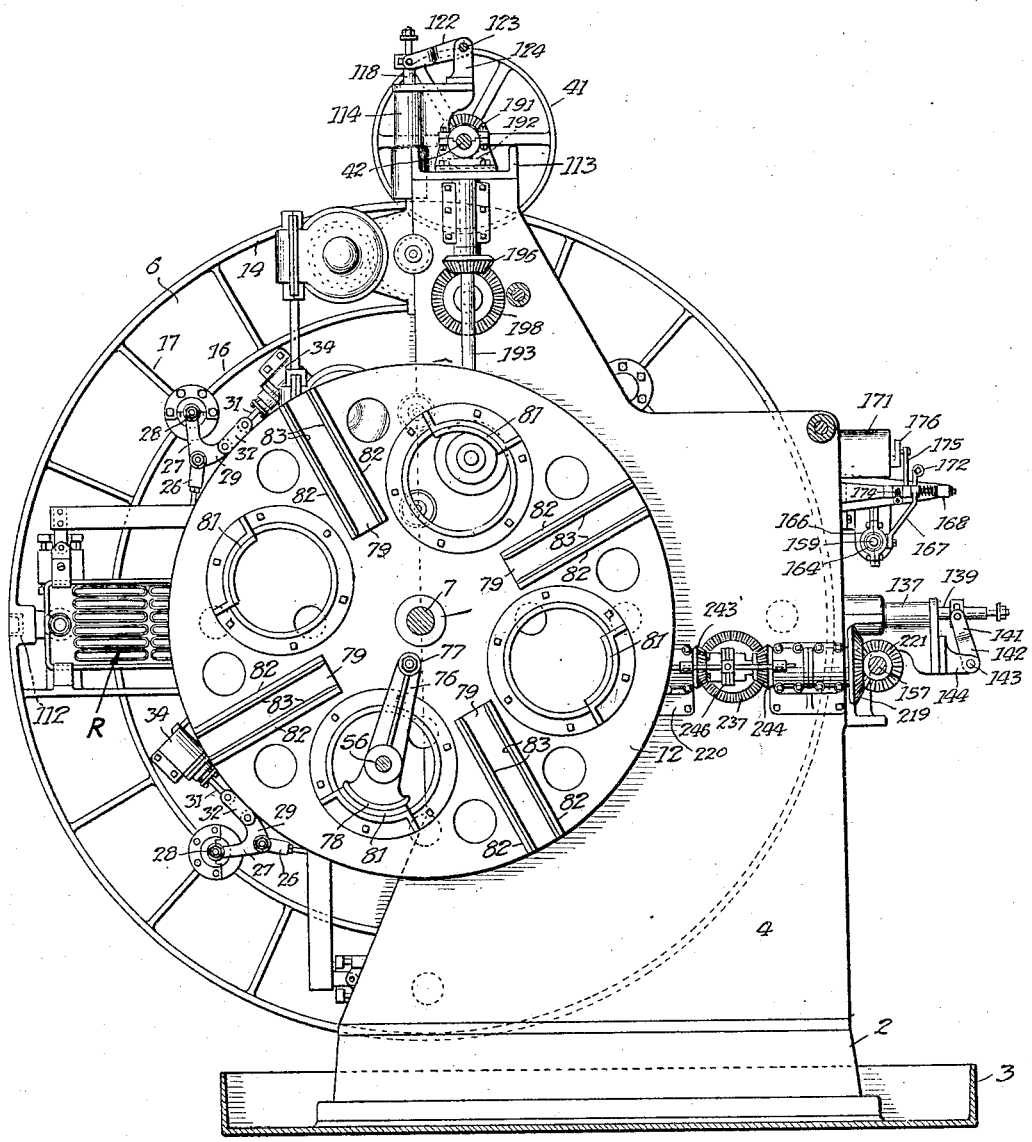
Fig. 6 is a vertical section along lines 6—6 on Figs. 4 and 5 and illustrates the indexing dial, a portion of the radiator dial and a portion of a radiator held therein also being shown.

The inner end of shaft 56 has an indexing arm 76 keyed thereto. This arm is provided upon one end with a roller 77 and upon its other end with an arcuate locking sector 78 as best shown in Figs. 4, 6 and 20. The indexing arm is positioned to engage the indexing dial 12 which for this purpose is formed with four radial channels 79 and four arcuate locking shoes 81. The four channels 79 are arranged radially and diametrically opposite each other extending from the periphery of the dial inwardly toward the center thereof. The channels 79 are formed by providing pairs of integral parallel ribs 82 projecting from one face of the dial. The ribs may be faced with wear plates 83 if desired. As viewed in Fig. 6 the indexing arm 76 is rotated in a clockwise direction and is so proportioned with respect to channels 79 that the roller 77 enters into the inner end of the channel 79 and upon rotation carries the dial 12 around clockwise one-quarter of a revolution, the roller 77 entering and leaving the inner end of channels 79. As the roller 77 emerges from a channel 79 the arcuate locking end 78 engages the arcuate locking shoe 81. The two being of the same radius fit snugly together and prevent any movement of the dial during the period of movement of roller 77 between the time it leaves one channel and enters the next. It is seen from the above that the dial 12 and the indexing arm 77 constitute a modified form of Geneva movement rotating the radiator dial 6, which is upon the same shaft with the indexing dial, intermittently one-quarter revolution upon each movement.

Shaft 56 being rotated through shaft 47 is of course only rotated when clutch 49 is engaged. Clutch 49 therefore controls the indexing of the dial. Clutch 49 is caused to be intermittently engaged through the medium of a bell crank lever 84 (Fig. 3a) the center point of which is pivoted at 86 to the end of standard 4. The end of one arm of the bell crank lever is connected to a clutch throw out collar 87 whereas the other arm 88 carries a roller which engages a star cam 89 rotatable upon a fixed shaft 90. The star cam has a ratchet wheel 91 secured thereto for rotation therewith. It follows that as the star cam 89 is rotated the clutch will be intermittently engaged and disengaged. The arm 88 is maintained in constant contact with the star cam through the medium of a tension spring 92 having one end connected to the end standard 4 and its other end connected to a third arm or projection 93 of the bell crank lever 84. The star cam 89 is rotated through the medium of a shaft 94 rotated in reverse directions by means later to be described. Shaft 94 is journalled in bearings 96 carried by the end standard 4 and has a cam drum 97 (Figs. 3 and 3a) upon its inner end. The cam drum 97 has a cam groove 98 therein which has a lateral throw and in which travels a cam roller 99 secured to one end of a lever 101. Lever 101 is pivoted intermediate its ends upon a rocker shaft 102 (Figs. 3, 24 and 25) supported in a bracket 103 secured to the end standard 4. The rocker shaft 102 extends through the end standard 4 and projects beyond the inner side thereof a short distance for purposes later to be described. The upper end of lever 101 is pivotally connected to an adjustable link 104 which constitutes a pawl and engages the ratchet wheel 91. It follows from the above that as the cam groove 98 moves roller 99 laterally first in one direction and then back the lever 101 will be rocked first to the left and then to the right which will cause link 104 to pull upwardly on the teeth of ratchet wheel 91 rotating the latter clockwise. The number of the teeth in ratchet 91 and the throw of the lever 101 are so adjusted that one movement of lever 101 will throw the star cam 89 from a low point to a high point thus engaging clutch 49 through bell crank 84.

The ratchet wheel 91 and consequently the star cam 89 is also rotated through the medium of a pawl link 106 pivotally connected to one end of a crank lever 107 the latter being pivoted at 108 to the housing 53. Link 106 is maintained in engagement with the ratchet by the tension spring 110. The other arm of the crank lever 107 carries a roller 109 which engages a clutch throw out cam 111 adjustably secured to the slotted disk 57. As the roller 109 rides up upon the throw out cam 111 crank lever 107 will be rotated clockwise pulling downwardly upon lever 106 thereby rotating ratchet wheel 91.

In operation the drum cam 97 operates to engage clutch 49 and after the indexing dial has rotated one-quarter of a revolution the gear 52 will have rotated one complete revolution and the throw out cam will have contacted with roller 109 to disengage the clutch.

For purposes of securing the radiator dial rigidly in position at each of its stations means in addition to the locking sector 78 and locking shoes 81, are provided for accurately locating and securing dial 6 in position. The latter sector and shoe members lock the indexing dial in position which is on the same shaft with the radiator dial and consequently lock the radiator dial. In addition to this however, the periphery of the radiator dial 6 is drilled and provided with locking cups 112 preferably formed of hardened steel (Figs. 20 and 21) and having a tapered bore therein.

These cups are engaged by tapered locking pins and associated mechanism now to be described with particular reference to Figs. 1, 3, 5, 11, 20, 21, 24 and 25. Secured to the top of the right and center standards as viewed in Figs. 1 and 4 is a beam or lock pin frame 113 spanning the space between the two standards and positioned to overlie the top of the radiator dial. The frame 113 is formed with an integral boss 114 disposed directly over dial shaft 7 which boss is bored to receive a vertical locking pin 116 (Fig. 22) having a tapered end portion 117 adapted to fit, when projected, into cups 112. The upper end 118 of pin 116 is reduced in diameter and is surrounded by a compression spring 119 which constantly urges the pin downward against dial 6 and into cups 112.

The upper end of pin 116 is pivotally connected at 121 to one bifurcated end of a throw out lever 122 which is fixedly secured to one end of a shaft 123 journalled in a bearing bracket 124 the latter being secured to frame 113. Shaft 123 extends to the right and across the top of the machine and is journalled at its right end in a bearing bracket 126 secured to the top of the right end standard 4. Adjacent bearing 126 (see Figs. 9, 11, and 24) an arm 127 is secured to shaft 123 to which arm is pivotally connected a pull rod 128. The lower end 129 of rod 128 (Figs. 3, 3a, 24 and 25) is pivotally connected to one arm 130 of a connecting lever fixedly secured to the inner projecting end of rocker shaft 102. The other arm 131 of the same lever has a pull rod 132 connected thereto which in turn is pivotally connected to a connecting T link 133 the latter link being pivotally secured to the end of standard 4. The connecting link 133 has attached thereto a rod 134 for actuating a side locking pin 136 shown in detail in Fig. 23. As can be seen from this figure the side horizontal locking pin 136 is substantially the same as pin 116 and is reciprocably carried in a lock pin frame 137 which is generally similar to lock pin frame 113 the former being secured to the rear edges of the left and center standards and arranged with the bore for the pin 136 horizontal in order that the pin 136 may enter the cup 112 disposed about the horizontal diameter of disk 6.

As in the vertical locking pin, the horizontal locking pin is constantly urged inwardly by a spring 138 surrounding the reduced stem portion 139. The outer end of the horizontal locking pin is adjustably engaged by a bifurcated end 141 of a throw out lever 142 the latter being secured to a shaft 143 extending across the back of the machine and being supported in bearings 144 and 146. The latter bearings are secured to frame 137 and center standard 4 respectively. Shaft 143 adjacent the bearing bracket 146 has an arm 147 secured thereto which arm is pivotally connected to rod 134. It follows that through rods 128, 132 and 134 and associated parts both vertical and horizontal locking pins 116 and 136 are operated simultaneously. These pins are operated through the medium of a rocker arm 148 pinned or otherwise secured to shaft 102. The outer extremity of arm 148 is connected to a bell crank lever 149 through a connecting rod 151. Bell crank lever 149 is pivoted intermediate its ends at 152 to the gear housing 53 and carries upon its outer end a cam roller 153 which engages cam plate 73.

Cam plate 73 has its low point disposed at approximately the same position around the circumference as the high point of cam 111 in order that the lock pins may be engaged to hold the disk 6 accurately in position when the clutch 49 is thrown out by cam 111. From Fig. 17 it will be observed that shortly after cam 111 rides off its high point cam 73 will present its high point to roller 153 thus rotating lever 149 clockwise to withdraw both vertical and horizontal locking pins.

From the foregoing description the manner of supporting the radiator sections and indexing or moving them to their operative stations can be seen. The operation of the foregoing mechanisms will be briefly summarized as follows.

With the dial 6 stationary a radiator section may be inserted between stationary clamping blocks 21 and movable clamping blocks 22 (Fig. 16) the latter being moved downwardly into rigid engagement with the radiator. This is accomplished by turning valve handle 38 to cause fluid to flow into the upper end of cylinder 34 thus actuating piston 33, lever 27, rod 26, and bar 24 to force the blocks 22 into tight engagement with the upper edge of the radiator shell. It is understood that if a short radiator section is used that one end and the center blocks will engage the radiator while if a longer radiator section is inserted the two end blocks will engage the radiator section. If a consecutive run of one sized radiator sections is being made the unused block may be removed. After the radiator section has been rigidly clamped between jaws 22 and 19 the main or radiator dial 6 is ready to be rotated.

The mechanism accomplishing this will be summarized. In operation the dial is of course intermittently rotated, the radiator sections being inserted and removed at one station during the stationary periods of the dial. Power for rotating the dial is obtained from any suitable sources (not shown) one source being connected to pulley 41 (Figs. 1 and 4) which is secured to and rotates shaft 42 which in turn rotates shaft 47 through bevel gears 44 and 46. Shaft 47 which is broken by clutch 49 drives the dial shaft 7 as heretofore described. Assuming dial 6 in a stationary position clutch 49 which controls the indexing (Fig. 3) will be disengaged and the stationary radiator dial will be rigidly held in position by means of locking pins 116 and 136. Rotation of shaft 94 by a second source of power later to be described will rotate drum cam 97 which controls clutch 49. Drum cam 97 will rotate lever 101 in clockwise direction. Clockwise movement of lever 101 will exert a pull on link 104 and thus rotate ratchet wheel 91 and its attached star cam 89. This rotation will remove the high point of cam 89 from arm 88 and allow spring 92 to pull clutch 49 into engagement. With clutch 49 engaged the lower end of shaft 47 will be rotated which in turn will drive worm wheel 52 (Figs. 17 and 18) by means of which shaft 56 is rotated. Shaft 56 through indexing arm 76 will intermittently engage and rotate indexing dial 12 by a modified Geneva movement. Indexing dial 12 being on the same shaft 7 with main dial 6 will rotate main dial 6 intermittently at one-quarter revolutions per movement.

The moment worm wheel 52 moves it carries with it cams 111 and 73. A slight movement of cam 111 will allow roller 109 to drop to the low point of cam 111 which will permit lever 106 to move upwardly preparatory to rotating ratchet wheel 91 for the next release. Cam 73 will present its high side under roller 153 and thus rotate crank lever 149 clockwise removing locking pins 116 and 136 outwardly against the action of springs 119 and 138 respectively to release dial 6. The two latter movements take place during the initial movement of indexing arm 76 and just prior to the entry of roller 77 of the indexing arm into channels 79. The dial 6 of course being held and retained stationary by sector 78 and shoes 81 until roller 77 enters a channel 79.

After one complete revolution of shaft 56 throw out cam 111 will engage roller 109 and rotate lever 107 clockwise thus actuating lever 106 to rotate ratchet wheel 91 to again bring the high point of cam 89 into engagement with arm 88. This movement will rotate bell crank lever 84 in a counter-clockwise direction disengaging clutch 49. At substantially the same time or just before cam 111 causes clutch 49 to be disengaged cam 73 will engage roller 153 and throw lever 149, rods 151, 132, 134 and 128 and will cause locking pins 116 and 136 to engage cups 112 to again lock the disk in stationary position.

It is to be noted that the indexing of dial 6 is accomplished through a mechanical fuse in the form of a breaking link 59 and that should the machine become jammed through any cause link 59 will snap and stop the rotation of dial 6. A further safety device is provided in the form of the electrical safety switch which opens the circuit should the breaking link become severed.

As previously mentioned the shaft 94 which carries drum cam 97 and controls clutch 49 is driven first in one direction and then in the other. This is accomplished through a source (not shown) preferably a pair of motors, or any other suitable source of power belted to a pulley 156 fixed to shaft 157 journalled in bearings 158 secured to the three standards 4. Shaft 157 is geared to a parallel control shaft 159 rotatably carried by bearings 160 through spur gear 161 keyed to shaft 157, idle gear 162 carried by a suitable shaft supported from the end frame 4 and gear 163 keyed to shaft 159 as is clearly shown in Figs. 5, 11 and 24.

One end of shaft 159 drives shaft 94 through a suitable worm and worm wheel mounted in a housing 165. Adjacent the center bearing 160, shaft 159 is provided with a screw 164 upon which a nut or collar 166 travels. The nut 166 has pivoted thereto a lever 167 pivoted in a bracket 168 the lever also being connected to a suitable snap action switch mechanism indicated generally by 169 for controlling a reversing switch 171. Any suitable switch actuating mechanism may be employed. In the present instance lever 167 terminates (Figs. 5 and 21) in a forked arm 172 which engages an arm 173 resiliently urged in either of two extreme positions by springs 174 engaging an arm 175 secured to arm 173. The arm 173 actuates a lever 176 which actuates a slotted link 177 secured to the shaft 178 of the switch 171.

Having described the radiator supporting and indexing mechanism the tools and tool operating mechanisms will now be described. As heretofore stated, from the front horizontal position of the radiator, the dial 6 carries the radiator to the upper vertical position where the disk is locked and the radiator is reamed and faced by tools coming in from each side of the disk.

For this purpose three horizontal reaming spindles (Figs. 4, 5, 8, and 12) 181 and 181a are journalled in standards 4, upon each side of dial 6, spindles 181 being on one side, the radiator side, of the dial and spindles 181a being upon the other side of the dial, that is, away from the radiator. The spindles on each side of the disk are arranged with their axes parallel to each other and in vertical alignment directly over the axis of the disk 6. Three spindles are provided upon each side of the disk to take care of two different heights of radiator sections, it is understood, of course, that only two spindles on each side are provided with reaming tools during the actual operation. The reaming spindles carry combined reaming and facing tools (not shown) designed to ream the openings in each end of the radiator section preparatory to tapping and to face the outer surface of the reamed hole.

Each spindle is carried by a sleeve 182 and 182a (Fig. 12) the sleeves being mounted for horizontal or axial movement within the standards 4 but being restrained from rotative movements. The sleeves 182 and 182a are provided at each end with bearings 183 and 183a which rotatably support the spindle shafts 184 and 184a within the sleeves. The spindles carry upon their ends adjacent disk 6, gears 186 and 186a and tool sockets or chucks 187 and 187a. Gears 186 and 186a upon the outer end spindles are rotated by gears 188 and 188a respectively, whereas the two pairs of gears 186 and 186a upon the center inner end spindles are engaged and rotated by gears 189 and 189a. The gears 188 and 188a and 189 and 189a are of sufficient width to permit the necessary axial movement of the sleeves 182 and 182a without becoming disengaged from gears 186 and 186a. It is to be noted that gears 188a and 189a are of even greater width than gears 188 and 189 for reasons which will hereafter be described.

Figure 2:
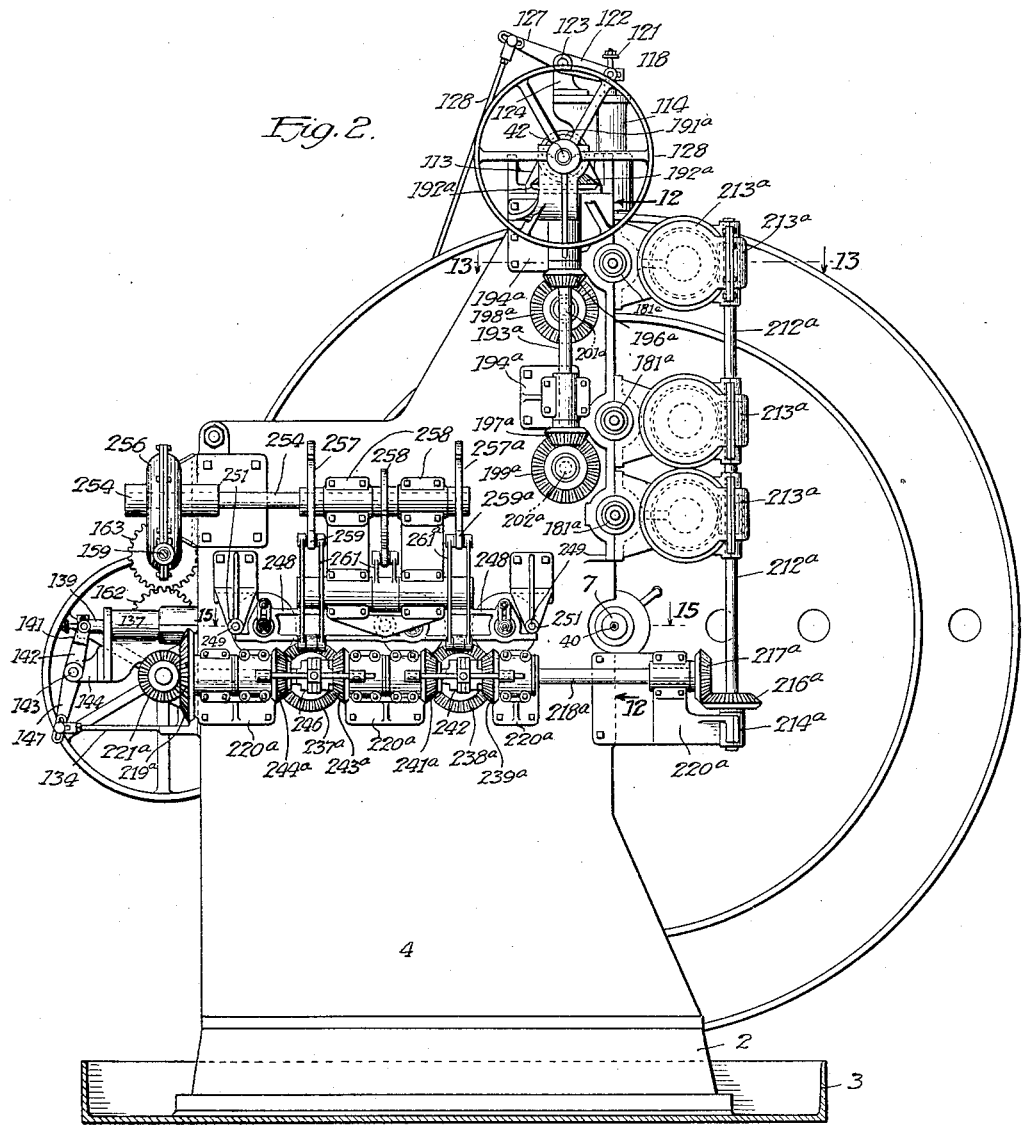
Fig. 2 is a left end elevation.

The spindles carrying the reamers should be driven continuously in one direction and are therefore driven from shaft 42 (Figs. 2, 4 and 5) which for this purpose is provided with a pair of bevel gears 191 and 191a which engage respectively a second pair of bevel gears 192 and 192a secured to the ends of vertical shafts 193 and 193a respectively, shaft 193 being journalled in bearings 194 secured to the center standard 4 and shaft 193a being journalled in bearings 194a secured to the end frame 4. Shaft 193 also carries a pair of bevel gears 196 and 197 which mesh with a pair of gears 198 and 199 keyed to the end of shafts 201 and 202 respectively which carry gears 188 and 189 upon their other ends. It will be seen that shafts 201 and 202 extend through the center standard 4 and are journalled therein. Similarly shaft 193a has secured thereto a pair of bevel gears 196a and 197a which drive a pair of bevel gears 198a and 199a keyed to shafts 201a and 202a respectively the latter shafts carry upon their other ends gears 188a and 189a. From the above shafting and gearing it is seen that the reaming chucks 187 and 187a are driven continuously in one direction from shaft 42.

In order to bring the spindles and their tools into contact with the radiator the spindle sleeves 182 and 182a are moved horizontally, that is, axially. It is obvious that the spindles 182 which approach dial 6 from the radiator side need only be brought up to the radiator and then an additional distance equal to the cutting distnce whereas, the spindles 182a which approach the dial from the opposite side to that upon which the radiator is held, must be moved an additional distance equal to the thickness of the dial to pass through apertures 18 in the dial. The spindles sleeves are each provided with a roller 203 (Figs. 1, 4, 12, and 13) which projects radially from the forward side of the sleeve. These rollers which are cam rollers, engage a cam groove 204 formed in a cam drum 206 keyed to a cam shaft 207 journalled in bearings 208 secured to the front edge of the center standard 4. The cam groove 204 has sufficient lateral throw to move sleeve 182, chuck 187 and the reaming tool held thereby up to a radiator and then sufficiently more to take a proper cut to ream and face the opening in the radiator. Shaft 207 has a worm wheel 209 secured to the outer end thereof which is engaged by a worm 211 keyed to a vertical shaft 212, the worm and worm wheel being encased in a housing 213.

It is understood that each of the sleeves 182 is provided with a roller 203 which engages cam drum 206 the latter drums being provided with worm wheels driven by worms upon shafts 212. Shafts 212 extend downwardly below the machine being supported by a bearing 214 adjacent which it carries a bevel gear 216 which meshes with a complementary bevel gear 217 secured to the end of a horizontal shaft 218 journalled in bearings 220. The latter shaft extends rearwardly to the back of the machine the other end having a bevel gear 219 keyed thereto which engages a bevel gear 221 keyed to shaft 157. It will be recalled that shaft 157 is driven in first one direction and then another from which it will be seen that drum 206 is rotated first in one direction and then in another. The gears are so chosen that the drum does not make over one revolution and accordingly, when being driven in one direction, will carry the sleeve and spindle into engagement with the radiator and upon reverse rotation will carry the sleeve and spindle away from the radiator. The spindles are, as has been previously pointed out, driven continuously in one direction from shaft 42.

The spindles 182a are driven in exactly the same manner and by elements similar to those previously described in connection with spindles 182 the elements actuating sleeves 182a being denoted by the same reference characters but bearing the suffix a (see Figs. 1, 2, 12 and 13). As previously stated, however, the spindles 182a must be given an initial movement in addition to that given spindles 182 to carry the former spindles through dial 6. For this purpose the drum 206a is provided with a cam groove 204a which has a greater lateral throw than 204 and serves to give the sleeve 182a its first initial axial movement to carry it through the dial 6. The cam groove 204a then serving to propel the sleeve up to the radiator and an additional distance in order to make the necessary cut.

It is believed to be clear from the foregoing that when the radiator sections are in an upper vertical position with the dial 6 locked in this position the connecting openings through the radiator sections are reamed and faced by means of reaming tools held in chucks 187 and 187a.

After the radiator sections have been reamed and faced the dial carries them to the third position which is a rear horizontal position diametrically opposite to the loading position. In this position the radiator sections are tapped, tapping tools coming in from each side of the disk and cutting a right thread upon one side and a left thread upon the other side. For this purpose six horizontal tapping spindles are provided, three upon each side of the dial, all six being in the horizontal alignment and in the plane of the axis of the dial shaft and mounted for rotation in the end and center standards. The tapping spindles are best illustrated in Figs. 1, 11, 14, and 15. As in the case of the reaming spindles three tapping spindles are provided upon each side of the dial, two only being used at a time depending upon the height of a radiator section. The tapping spindles upon the radiator side of the dial are indicated generally by reference numerals 222 and those upon the opposite side of the dial by 222a.

The tapping spindles upon the radiator side of the dial are identical and therefore only one will be described. The spindles 222 are mounted within the sleeve 223 and secured for rotation therewith by means of two keys 224 which permit axial movement of the spindle relative to the sleeve but prohibit rotative movement between the two. The spindle upon its inner end has secured thereto a leader screw 226. The sleeve 223 is mounted for rotation upon bearings 227 secured to each side wall of the standard 4 and between webs thereof the sleeve is flanged on each side of the bearing to prevent axial movement thereof. Upon one end the sleeve is provided with a gear 228 keyed thereto, the gear also being prevented from moving axially by means of a collar 229. The leader screw end 226 of the spindle is engaged by a stationary leader nut 231 which is secured to the side of the standard 4 by a collar 225 secured to the frame 4 and a weakened U-shaped breaking piece 235 bolted to the collar. The breaking piece straddles a lug formed on the end of the leader nut to prevent the nut from rotating as well as moving axially, the leader screw passing between the weakened legs of the breaking piece. This construction prevents overloading of the taps. If necessary a breaking piece may be placed upon both ends of the leader nut and screw.

Accordingly when the gear 228 for sleeve 223 is rotated thus rotating spindle 222 the leader screw 226 will turn within the leader nut 231 and the spindle will not only be rotated but will be positively forced inward in accordance with the threads upon the leader nut and screw. The two latter members are removable and may be changed to vary the pitch of the thread in accordance with the tap being supported in the chuck end of the spindle. The end of the spindle adjacent the dial is provided with a socket-like chuck 230 for receiving the taps (not shown) which may be of any commercial type.

The outer end spindle 222 and its gear 228 is driven (Figs. 1, 2, 4, 5, 8, 10, and 11) by gears 232 upon the end of a shaft 233. The center and inner end gears 228 are driven from a single gear 234 upon the end of a shaft 236. Shafts 233 and 236 extend through the standard 4 and carry upon their ends bevel gears 237 and 238 respectively (Fig. 8) in position to be engaged by gears upon shaft 218. Shaft 218 is provided with a pair of opposed bevel gears 239 and 241 arranged on diametrically opposite sides of gear 238 and with a clutch 242 therebetween. The clutch is arranged to connect either gear 239 or 241 to shaft 218 thus making it possible to drive gear 238 in either direction. Shaft 218 is further provided with two additional opposed bevel gears 243 and 244 arranged upon opposite sides of gear 237 and having a clutch 246 therebetween adapted to secure either gear 243 or 244 to shaft 218 thus making it possible to drive gear 237 selective in either direction. It follows from the above that the tapping spindles 222 are driven from shaft 218 in such a manner that they may be rotated in either direction in order to permit tapping of either a right or left hand thread by each of the spindles depening of course upon the leader screws and nuts.

The three spindles 222a situated upon the opposite side of disk 6 are constructed and driven in substantially the same manner, that is, the spindles are mounted in a sleeve 223a secured for rotation but against axial movement in the end standard 4. The spindles themselves are keyed to the sleeves for axial movement relative thereto and for rotation therewith. The sleeves carry gears 228a upon one end which engage gears 232a and 234a as heretofore described in connection with the other set of spindles. The gears 232a and 234a are secured to shafts and are driven by suitable gears and clutches as described in connection with spindles 222 and gears 228, 232 and 234. The gearing and clutch members for spindles 222a bear the same reference numerals as heretofore described in connection with spindles 222 with the addition of the suffix a.

The spindles 222a approachoing the radiator from the opposite side of the dial 6 must be moved through the dial before they engage the radiator sections. For this reason the spindles are given an initial movement to carry them through the dial before engagement with the radiator. Accordingly the rear ends of spindles 222a (Figs. 1, 2, 4, 12, and 15) are provided with extensions 247, which extensions carry the leader screws 226a. The leader nuts 231a are carried by a reciprocal frame 248 mounted for horizontal movement parallel to the axes of the spindles, being guided for such movement upon rods 249 extending from the end standard 4. The frame 248 is provided with bearings 251 at each end to receive the rods 249. The frame 248 carrying the spindles therewith is reciprocated by a cam mechanism actuated from the reversing shaft 159 which carries upon its right end as viewed in Fig. 5 a worm 252 which engages a worm wheel 253 upon the end of a shaft 254, journalled in bearings 255, the worm and worm wheel being encased in a housing 256 secured to the end of end standard 4.

Shaft 254 has keyed thereto a pair of cam disks 257 and 257a (Figs. 1, 2, 12, and 15) and a third cam 258, the cam 258 having its high point opposite the low point of cams 257 and 257a. Cams 257 and 257a are engaged by a pair of cam rollers 259 and 259a respectively carried in one end of a pair of levers 261 and 261a, the levers being secured intermediate their ends to a rocker shaft 262 journalled in outboard bearing 263 projecting from the end frame 4. The lower end of levers 261 and 261a are pivoted to short links 264 the latter links being pivotally connected to frame 248. The rocker shaft 262 has a third lever or arm 266 keyed thereto which carries upon its outer end a cam roller 267 which engages cam 258.

The worm 252 and worm gear 253 are so selected that shaft 254 is rotated slightly less than one revolution in each direction. The cams 257 and 257a and 258 therefore revolve less than one revolution and through levers 261 and 266 positively reciprocate the carrier 248. It is to be noted that the cams 257 and 257a have a considerable dwell upon their high points during which time the frame 248 is in its inward position to present the tapping spindles 222a into contact with the radiator section. It is during this dwell that the tapping operation takes place.

After the tapping operation the dial carries the radiator section to the lower vertical position which is an idle position it being understood of course that other radiator sections are being loaded, reamed and tapped while the one section is in the idle position. Following the idle position the radiator section is again carried to the initial or front horizontal position where it is unloaded and a section to be threaded inserted in its place.

It is believed that the operation of the machine is apparent from the above description of the various sections thereof and only a brief summary of the operation of the machine as a whole will be given.

Two sources of power are required for the machine neither one of which is shown in the drawings one being for the continuously rotating mechanism to be applied to pulley 41 and shaft 42 and the other being a reversely rotating source to be applied to pulley 156 and shaft 157. Suitable control switches for starting and stopping the sources of power are of course supplied and may be of any standard construction as may be the driving motors. Assume the pulleys 41 and 156 are being rotated the first continuously in one direction and the second in alternate directions and the clutch 49 is disengaged. The main dial will be stationary and the operator may place a radiator section between the clamping jaws 21 and 22 first removing a finished radiator section if there be one in the machine. The securing of a radiator section on the disk is accomplished by operation of valve handle 38 which will direct the flow of fluid such as air to either side of piston 33 which will either release or clamp a radiator section between the jaws 18 and 22 according to the position of handle 38. During this unloading and loading of a radiator section into the machine other sections will be in the course of being reamed, faced and tapped as will be described in the similar operations of one radiator section.

The radiator section having been clamped in place the rotation of pulley 156 and its shaft 157 will rotate shaft 159 through gears 161, 162, and 163. The rotation of shaft 159 will operate the reversing mechanism through screw 164 and collar 166 which will cause shafts 159 and 157 to be rotated first in one direction and then another. Shaft 159 also rotates shaft 94 which latter shaft carries the drum cam 97. Cam 97 controls clutch 49 through lever 101, link 104, ratchet 91, cam 89 and lever 84. Upon engagement of clutch 49 the lower portion of shaft 47 will be rotated, thus driving gear 52, sleeve 54 and thereby shaft 56 and indexing arm 76. The latter arm will rotate indexing disk 12 one-quarter revolution carrying with it main dial 6. After the main dial 6 has been moved one-quarter revolution the locking pins 118 and 136 will secure the dial rigidly in position.

One-quarter revolution of the dial has moved the radiator section into a vertical position where it is reamed and faced by tools carried by the reaming spindles 181 and 181a, the spindles being rotated through shafts 193 and 193a the latter shafts being driven from shaft 42 through gears 191, 191a, 192 and 192a. The spindles are moved into the radiator through the medium of cam drums 206 and 206a, driven by shafts 212 and and 212a through shafts 218 and 218a, the latter being driven from the reversing shaft 157. The cam drums are rotated substantially one revolution in one direction and then back again, carrying the spindles into the radiator section and out again. As previously stated, the cam drums 206a impart an initial movement to the spindles 181a which carry the spindles and reaming tools through the dial and to the radiator.

After the reaming operation the dial is released and rotated or indexed another one-quarter revolution to bring the radiator section to a horizontal position diametrically opposite the first or loading position. The dial is again locked in this position by pins 118 and 136. When in this third position the radiator section is tapped by taps inserted in the chucks of spindles 222 and 222a positioned on opposite sides of the dial. The taps on the opposite side of the dial from the raditor are moved up to the radiator through the medium of cams 257 and 257a secured to shaft 254 which is driven from the reversing shaft 159 through gears 253 and 252. The reversing shafts 159 and shaft 254 rotate the cams 257 and 258 first in one direction and then the other moving the tapping spindles into engagement with the radiator. Shaft 254 also carries a retracting cam 258 which positively moves the tapping spindles backwardly again. Both sets of spindles are positively fed into the radiator section by leader screws 226 and 226a and leader screw nuts 231 and 231a the spindles being positively driven through gears 228 and 228a, 234 and 234a which in turn are rotated by shafts 233, 233a and 236 and 236a which in turn are geared to shafts 218 and 218a both of which are driven from the reversing shaft 157.

After the radiator section has been tapped the mechanism is so timed that the dial is indexed another quarter of a revolution thus bringing the radiator to the lower vertical position which is an idle position. While this radiator is in this idle position, however, two other radiator sections are being operated upon, one being reamed and faced and the other being tapped.

Following the idle position, the dial is indexed again the latter then having made one complete revolution and having been reamed, faced and tapped is back in its initial position where it is unloaded and another section inserted in its place. From the above it is seen that the machine is capable of continuous operation although the dial has an intermittent motion that both sides of both ends of a radiator section are operated upon.

It is believed that the operation and construction of the machine embodying the principles of this invention as heretofore described is clear from the foregoing description. It is obvious that many changes may be made in the details of construction of the foregoing machine which is given for illustrative purposes only without departing from the spirit and scope of the invention as defined in the claims appended hereto.

I claim:

1. In a machine for finishing radiator sections, a rotary support for a plurality of radiator sections, a shaft for rotating said support, means for rotating said shaft continuously in one direction, a clutch on said shaft, control mechanism for engaging said clutch, a shaft for controlling said mechanism and means for rotating said latter shaft in alternate directions.

2. In a machine for finishing radiator sections, a rotary support for a plurality of radiator sections, a shaft for rotating said support, means for rotating said shaft continuously in one direction, a clutch on said shaft, control mechanism for engaging said clutch, a cam for controlling said mechanism, and means for rotating said cam in alternate directions.

3. In a machine for finishing radiator sections, a rotary support for a plurality of radiator sections, a shaft for rotating said support, a clutch on said shaft, a star cam for controlling said clutch, means for rotating said cam to cause said clutch to be engaged, and separate means for rotating said cam to cause said clutch to be disengaged.

4. In a machine for finishing radiator sections, a rotary support for a plurality of radiator sections, a shaft for rotating said support, means for rotating said shaft continuously in one direction, a clutch on said shaft, a driven shaft rotated by said clutch shaft, control mechanisms for engaging said clutch, a shaft for controlling said mechanism, means for rotating said latter shaft in alternate directions, and means operable from said driven shaft for disengaging said clutch.

5. In a machine for finishing radiator sections, a rotary support for a plurality of radiator sections, a shaft for rotating said support, means for rotating said shaft continuously in one direction, a clutch on said shaft, a driven shaft rotated by said clutch shaft, control mechanism for operating said clutch, a shaft for controlling said mechanism, means for rotating said latter shaft in alternate directions, means operable from said driven shaft for disengaging said clutch, and means actuated by said driven shaft to lock said support against movement when said clutch is disengaged.

6. In a machine for finishing radiator sections, a support for a radiator section, clamping means for securing a radiator section to one side of said support, means for supporting a tool in operative relation upon each side of said support, means for moving said tools into operative contact with said radiator section including means for imparting an initial movement to one tool independently of the other tools to move it through said support into proximity to the radiator section thereon.

7. In a machine for finishing radiator sections, a support for a radiator section, clamping means for securing a radiator section to one side of said support, means for supporting a set of tools in operative relation upon each side of said support, means for moving said tools into operative contact with said radiator section including means for imparting an initial movement to one set of tools independently of the other set of tools to move it through said support and into proximity to the radiator section thereon.

8. In a machine for finishing radiator sections, a support for a radiator section, clamping means for securing a radiator section to one side of said support, means for supporting operating tools upon both sides of said support including supporting sleeves for said tools, means for moving said tools relatively to said sleeves, means for advancing said sleeves toward said support to cause said tools to operate upon said radiator section and means for causing said tool moving means to become inoperative upon excessive resistance to their movements.

9. In a machine for finishing radiator sections, a support for a radiator section, clamping means for securing a radiator section to one side of said support, means for supporting operating tools upon both sides of said support including supporting sleeves for said tools, means for moving said tools relatively to said sleeves, means for advancing said sleeves periodically toward said support to cause said tools to operate upon said radiator section and means for causing said tool moving means to become inoperative upon excessive resistance to their movements.

10. In a machine for finishing radiator sections, a support for a radiator section, clamping means for securing a radiator section to one side of said support, means for supporting operating tools upon both sides of said support including supporting sleeves for said tools, means for moving said tools relatively to said sleeves and means for advancing said sleeves periodically toward said support to cause said tools to operate upon said radiator section, said advancing means being constructed to advance the tools upon one side of said support a greater distance than the tools upon the other side.

11. In a machine for finishing radiator sections, a support for a radiator section, clamping means for securing a radiator section to one side of said support, means for supporting operating tools upon both sides of said support including supporting sleeves for said tools, means for moving said tools relatively to said sleeves and means for advancing said sleeves periodically toward said support to cause said tools to operate upon said radiator section, said advancing means being constructed to give the tools upon one side of the support an initial movement to advance the tools the thickness of the support.

12. In a machine for finishing radiator sections, a support for a radiator section, clamping means for securing a radiator section to one side of said support, means for supporting a tool in operative relation upon each side of said support, means for moving said tools into operative contact with said radiator section including means for rotating said tools and moving said tools toward said support in accordance with a predetermined pitch of thread and means for moving one of said tools bodily toward said support a predetermined distance said latter movement being independent of said first movement.

13. In a machine for finishing radiator sections, a support for a radiator section, clamping means for securing a radiator section to one side of said support, means for supporting a spindle in operative relation upon each side of said support, a sleeve for each of said spindles mounted for rotation about its axis and secured against movement along their axes, said spindle being mounted in said sleeve for rotation and axial movement therein and a leader screw and nut associated with said sleeve and spindles to force said spindles toward said support.

14. In a machine for finishing radiator sections, a support for a radiator section, clamping means for securing a radiator section to one side of said support, means for supporting a spindle in operative relation upon each side of said support, a sleeve for each of said spindles mounted for rotation about its axis and secured against movement along its axes, said spindle being mounted in said sleeve for rotation and axial movement therein, a leader screw and nut associated with said sleeve and spindles to force said spindles toward said support, and means for imparting axial movement to the spindles upon one side of said support in addition to the movement caused by said leader screw and nut.

15. In a machine for finishing radiator sections, a rotary support, means for securing a plurality of radiator sections on said support arranged radially thereof, a set of reaming tools disposed in the line of motion of said support upon each side of said support and arranged radially thereof, a set of tapping tools disposed in the line of motion thereof upon each side of said support and also arranged radially thereof and means for intermittently rotating said support to present the radiator sections thereon successively to the reaming and tapping tools.

16. In a machine for finishing radiator sections, an intermittenly movable support, clamps for rigidly securing a radiator section to said support, tools supported in operative position with respect to said radiator section, a drive shaft rotated in alternate directions for operating certain of said tools while the radiator section is held on said support, and a drive shaft for intermittently moving said support to carry a radiator section thereon into and out of operating position with respect to said tools, said latter shaft being partially controlled by said first mentioned shaft.

17. In a machine for finishing radiator sections, an intermittently movable support, clamps for rigidly securing a radiator section to said support, tools supported in operative position with respect to said radiator section, a drive shaft rotated in alternate directions for operating certain of said tools while the radiator section is held on said support, and a drive shaft rotated continuously in one direction for intermittently moving said support to carry a radiator section thereon into and out of operating position with respect to said tools, said latter shaft being partially controlled by said first mentioned shaft.

18. In a machine for finishing radiator sections, a rotary dial, releasable clamps for securing a plurality of radiator sections on one side of said dial, means for supporting tools in operative position upon both sides of the radiator sections, means for intermittently rotating said dial between said tools to present the radiator sections held thereby successively to the operating tools, means for simultaneously operating said tools when said radiator section is in operative position with respect thereto and means for interrupting said dial rotating means upon abnormal resistance to rotary movements thereto.

19. In a machine for finishing radiator sections, an intermittently rotatable dial, releasable clamps for securing a plurality of radiator sections on one side of said dial, means for supporting tools in operative position with respect to said radiator sections, means for intermittently rotating said dial to present the radiator sections held thereby successively to the operating tools, means for simultaneously operating said tools while the radiator sections are held on said support and means for interrupting said latter means upon abnormal resistance to their operation.

20. In a machine for finishing radiator sections, an intermittently rotatable dial, releasable clamps for securing a plurality of radiator sections on one side of said dial, means for supporting tools in operative position upon both sides of the radiator sections, an electric motor for intermittently rotating said dial to present the radiator sections held thereby successively to the operating tools, means for simultaneously operating said tools while the radiator sections are held on said support and means for opening the circuit to said motor to interrupt the rotation of said dial upon abnormal resistance to rotation thereof.

21. In a machine for finishing radiator sections, an intermittently rotatable dial, releasable clamps for securing a plurality of radiator sections on one side of said dial, means for supporting tools in operative position upon both sides of the radiator sections, an electric motor for intermittently rotating said dial to present the radiator sections held thereby successively to the operating tools, means for simultaneously operating said tools while the radiator sections are held on said support, means for opening the circuit to said motor to interrupt the rotation of said dial upon abnormal resistance to rotation thereof and means for breaking the mechanical connection from said motor to said dial to interrupt the rotation of said dial upon abnormal resistance to rotation thereof.

22. In a machine for finishing radiator sections, a rotary dial, clamps for securing a plurality of radiator sections on one face of said dial, an indexing dial, a shaft common to said two dials, tools for operating upon the radiator sections supported in said dial, a second shaft having means thereon engaging said indexing dial for intermittently rotating said two dials to preesnt the radiator sections held thereby to said tools, a third shaft for rotating said second shaft, a clutch on said third shaft and means for intermittently engaging and disengaging said clutch.

23. In a machine for finishing radiator sections, a rotary support for a plurality of radiator sections, a shaft for rotating said support, a clutch on said shaft, means for intermittently engaging said clutch and means for disengaging said clutch after predetermined movement thereof independently of said clutch engaging means.

24. In a machine for finishing radiator sections, a rotary dial, means for supporting a plurality of radiator sections on one face of said dial, an indexing dial, a shaft common to both dials and to which both dials are secured, a driving shaft, a shaft driven from said driving shaft, a clutch in said driving shaft to control rotation of said driven shaft and connections between said driven shaft and said indexing dial for intermittently rotating both dials.

25. In a machine for finishing radiator sections, a rotary dial, means for supporting a plurality of radiator sections on one face of said dial, an indexing dial, a shaft common to both dials and to which both dials are secured, a driving shaft, a shaft driven from said driving shaft, a clutch in said driving shaft to control rotation of said driven shaft and connections between said driven shaft and said indexing dial for intermittently rotating both dials, said clutch being partially controlled by said driven shaft.

26. In a machine for finishing radiator sections, a rotary dial, means for supporting a plurality of radiator sections, on one face of said dial, an indexing dial having radial grooves therein, a shaft common to both dials and to which both dials are secured, a driving shaft, a shaft driven from said driving shaft, a clutch in said driving shaft to control rotation of said driven shaft and an arm on said driven shaft arranged to engage in said grooves to intermittently rotate said dials.

27. In a machine for finishing radiator sections, a rotary dial, means for supporting a plurality of radiator sections on one face of said dial, an indexing dial, a shaft common to both dials and to which both dials are secured, a driving shaft, a shaft driven from said driving shaft, a clutch in said driving shaft to control rotation of said driven shaft and connections between said driven shaft and said indexing dial for intermittently rotating both dials and means for intermittently engaging said clutch.

28. In a machine for finishing radiator sections, a rotatable dial, clamps for rigidly securing a plurality of radiator sections to one face of said dial with the major portion of said sections lying within the maximum diameter of said dial, means for supporting tools in operative position with relation to said radiator sections and upon each side of said dial when in inoperative position, said dial having apertures therethrough to permit certain of said tools to pass therethrough and means for rotating said dial intermittently to carry the radiator sections thereon successively into and out of operative position with respect to said tools.

29. In a machine for finishing radiator sections, an intermittently movable support, clamps for rigidly securing a radiator section to said support, tools supported upon opposite sides of said support and adapted to be moved into operative position with respect to said radiator section, a drive shaft for operating certain of said tools while the radiator section is held on said support, said support being apertured to permit certain of said tools to pass therethrough, and a drive shaft for intermittently moving said support to carry a radiator section thereon into and out of operating position with respect to said tools, said latter shaft being partially controlled by said first mentioned shaft.

30. In a machine for finishing radiator sections, a rotatable dial, clamps for securing a plurality of radiator sections radially about one face of said dial with the major portion of said section lying within the diameter of said dial, tools supported upon opposite sides of said dial and adapted to be moved into operative position with respect to said radiator sections, means for operating said tools while the radiator sections are supported on said dial, said dial having apertures therethrough to permit certain of said tools to pass therethrough and means for intermittently rotating said dial to present the radiator sections secured thereto successively to the operating tools.

31. In a machine for finishing radiator sections, an intermittently rotatable dial having means thereon for supporting a plurality of radiator sections on one face of said dial arranged radially about the axis of rotation thereof with the major portion of said radiator sections lying within the diameter of said dial, and clamps for securing said radiator sections to said means, a plurality of tools for performing successive operations upon said radiator sections and means for intermittently rotating said support to present the radiator sections successively to said tools.

32. In a machine for finishing radiator sections, a rotary dial having means upon one face thereof for supporting a plurality of radiator sections upon said side of said dial with the major portion of said sections lying within the diameter of said dial, an indexing dial connected to said rotary dial for rotation therewith, a shaft independent of said dials, means thereon for intermittently rotating said dials, and tools for operating upon the radiator sections supported in operating relation thereto by said radiator dial.

33. In a machine for finishing radiator sections, a rotary dial, clamps for securing a plurality of radiator sections on one face of said dial, tools for performing a plurality of operations upon the radiator sections when secured upon said dial, a shaft for operating certain of said tools, a second shaft for driving other of said tools, a shaft for rotating said dial, a clutch on said latter shaft and means actuated by said first mentioned tool operating shaft for intermittently engaging said clutch.

34. In a machine for finishing radiator sections, a rotary support for a plurality of radiator sections, a shaft for rotating said support, means for rotating said shaft, a clutch on said shaft, control mechanism for engaging said clutch, a shaft for controlling said mechanism and means for rotating said latter shaft in alternate directions.

35. In a machine for finishing radiator sections, a rotary support for a plurality of radiator sections, a shaft for rotating said support, means for rotating said shaft, a clutch on said shaft, a driven shaft rotated by said clutch shaft, control mechanisms for engaging said clutch, a shaft for controlling said mechanism, means for rotating said latter shaft in alternate directions, and means operable from said driven shaft for disengaging said clutch.

36. In a machine for finishing radiator sections, an intermittently movable support, clamps for rigidly securing a radiator section to said support, tools supported in operative position with respect to said radiator section, a drive shaft rotated in alternate directions for operating certain of said tools while the radiator section is held on said support, and a drive shaft for intermittently moving said support to carry a radiator section thereon into and out of operating position with respect to said tools, said latter shaft being partially controlled by said first mentioned shaft.

In witness of the foregoing I affix my signature.

VICTOR E. FLODIN.